(12) United States Patent
Kawahara et al.

(10) Patent No.: US 12,320,894 B2
(45) Date of Patent: Jun. 3, 2025

(54) VEHICLE AND OBSTACLE DETECTION DEVICE

(71) Applicant: Panasonic Intellectual Property Management Co., Ltd., Osaka (JP)

(72) Inventors: Shingo Kawahara, Kanagawa Ken (JP); Teppei Shibata, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 239 days.

(21) Appl. No.: 17/978,724

(22) Filed: Nov. 1, 2022

(65) Prior Publication Data
US 2023/0052064 A1 Feb. 16, 2023

Related U.S. Application Data

(63) Continuation of application No. PCT/JP2021/026027, filed on Jul. 9, 2021.

(30) Foreign Application Priority Data

Aug. 3, 2020 (JP) .................................. 2020-132025
Mar. 30, 2021 (JP) .................................. 2021-056608

(51) Int. Cl.
*G01S 15/931* (2020.01)
*B60T 7/22* (2006.01)
(Continued)

(52) U.S. Cl.
CPC ............. *G01S 15/931* (2013.01); *B60T 7/22* (2013.01); *B60W 10/04* (2013.01); *B60W 10/18* (2013.01);
(Continued)

(58) Field of Classification Search
CPC ............. G01S 15/931; G01S 2015/938; G01S 15/878; G01S 3/808; B60T 7/22;
(Continued)

(56) References Cited

U.S. PATENT DOCUMENTS

| | | | |
|---|---|---|---|
| 2007/0046449 A1* | 3/2007 | Koike | ....................... B60T 7/22 340/435 |
| 2015/0307091 A1 | 10/2015 | Gokan et al. | |
| 2016/0116584 A1* | 4/2016 | Fukuman | ................ G01S 15/46 367/93 |

FOREIGN PATENT DOCUMENTS

| | | |
|---|---|---|
| CN | 104755344 | 7/2015 |
| JP | 05-113479 | 5/1993 |

(Continued)

OTHER PUBLICATIONS

International Search Report (ISR) from International Searching Authority (Japan Patent Office) in International Pat. Appl. No. PCT/JP2021/026027, dated Sep. 28, 2021, together with an English language translation.

(Continued)

*Primary Examiner* — Anne Marie Antonucci
*Assistant Examiner* — Jingli Wang
(74) *Attorney, Agent, or Firm* — Greenblum and Bernstein, P.L.C.

(57) ABSTRACT

A vehicle sets a first determination region of a first obstacle and a second determination region, on the basis of a position of the first obstacle. The second determination region is located at a position farther than the first determination region. A reliability of the second obstacle is set to a first reliability in a case where a position of a second obstacle falls outside the first determination region and falls outside the second determination region. The reliability of the second obstacle is set to a second reliability higher than the first reliability in a case where the position of the second (Continued)

obstacle falls within the first determination region or falls within the second determination region. Braking is applied to the vehicle body and/or acceleration of the vehicle body is suppressed, on the basis of the reliability of the second obstacle and the position of the second obstacle.

20 Claims, 12 Drawing Sheets

(51) Int. Cl.
  *B60W 10/04* (2006.01)
  *B60W 10/18* (2012.01)
  *B60W 30/09* (2012.01)
(52) U.S. Cl.
  CPC .......... *B60W 30/09* (2013.01); *B60T 2210/32* (2013.01); *B60W 2420/54* (2013.01); *B60W 2554/20* (2020.02); *G01S 2015/938* (2013.01)
(58) Field of Classification Search
  CPC ... B60T 2210/32; B60W 10/04; B60W 10/18; B60W 30/09; B60W 2420/54; B60W 2554/20; B60W 2420/408; B60W 40/02; B60W 2520/10; B60W 2520/105; B60W 2540/10; B60W 2540/12; B60W 10/06; B60W 30/085; B60W 30/181; G08G 1/16
  See application file for complete search history.

(56) References Cited

FOREIGN PATENT DOCUMENTS

| | | |
|---|---|---|
| JP | 2000-214259 | 8/2000 |
| JP | 2001-273595 | 10/2001 |
| JP | 2008-032499 | 2/2008 |
| JP | 2008-039497 | 2/2008 |
| JP | 2016-081449 | 5/2016 |
| JP | 2019-070986 | 5/2019 |
| WO | WO-2020008534 A1 * | 1/2020 |

OTHER PUBLICATIONS

Office Action issued by the China National Intellectual Property Administration (CNIPA) in Chinese Patent Application No. 202180060130.2, dated Apr. 3, 2025, together with an English language translation.

* cited by examiner

VEHICLE AND OBSTACLE DETECTION DEVICE

CROSS-REFERENCE TO RELATED APPLICATIONS

This application is a continuation of International Application No. PCT/JP2021/026027, filed on Jul. 9, 2021, which claims the benefit of priority of the prior Japanese Patent Applications No. 2020-132025, filed on Aug. 3, 2020, and No. 2021-056608, filed on Mar. 30, 2021, the entire contents of which are incorporated herein by reference.

FIELD

The present disclosure relates to a vehicle and an obstacle detection device.

BACKGROUND

There has been known an obstacle detection device that is mounted on a vehicle to detect an obstacle by using reflection of sound waves (for example, JP 2016-081449 A).

Meanwhile, an obstacle detection device that is mounted on a vehicle to detect an obstacle by using reflection of sound waves is still demanded to appropriately detect an obstacle.

SUMMARY

A vehicle according to the present disclosure includes a first wheel, a second wheel, a vehicle body, wave transmission devices, and wave reception devices. The first wheel and the second wheel are arranged in a predetermined direction. The vehicle body is coupled to the first wheel and the second wheel. The vehicle body is movable by the first wheel and the second wheel. The wave transmission devices are each arranged in a predetermined end portion of the vehicle body and configured to transmit a transmission sound wave. The wave reception devices are each arranged in the predetermined end portion of the vehicle body and configured to receive a reception sound wave. The wave transmission devices each transmit a first transmission sound wave. The wave reception devices each receive, as the reception sound wave, a first reflected sound wave corresponding to the first transmission sound wave. At least a position of a first obstacle is obtained on the basis of the first transmission sound wave and the first reflected sound wave. A motionless same object determination region and a moving same object determination region are set on the basis of the position of the first obstacle. The moving same object determination region is located at a position farther than the motionless same object determination region with respect to the vehicle body. The wave transmission devices each next transmit a second transmission sound wave. The wave reception devices each receive, as the reception sound wave, a second reflected sound wave corresponding to the second transmission sound wave. A position of a second obstacle is obtained on the basis of the second transmission sound wave and the second reflected sound wave. A reliability of the second obstacle is set to a first reliability in a case where the position of the second obstacle falls outside the motionless same object determination region and falls outside the moving same object determination region. A reliability of the second obstacle is set to a second reliability higher than the first reliability in a case where the position of the second obstacle falls within the motionless same object determination region or falls within the moving same object determination region. Braking is applied to the vehicle body and/or acceleration of the vehicle body is suppressed, on the basis of the reliability of the second obstacle and the position of the second obstacle.

DETAILED DESCRIPTION

Hereinafter, an embodiment of a vehicle and an obstacle detection device according to the present disclosure will be described with reference to the drawings.

First Embodiment

An example of the first embodiment will be described by using the drawings.

Configuration of Vehicle

Figure 1A:
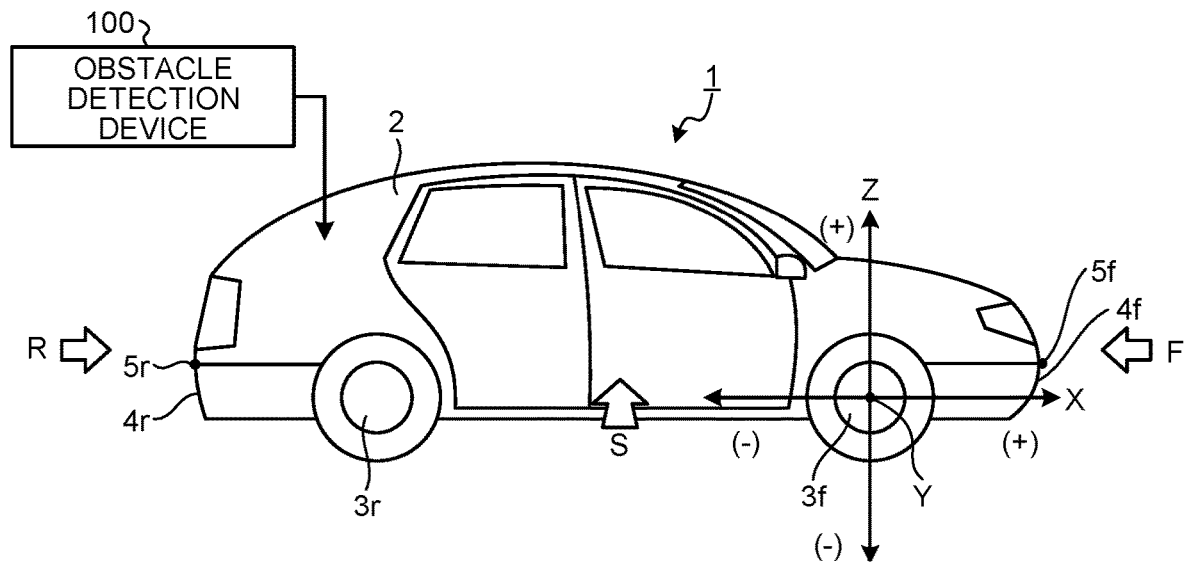
FIG. 1A is a schematic diagram illustrating an example of a vehicle including an obstacle detection device according to a first embodiment.
Figure 1B:
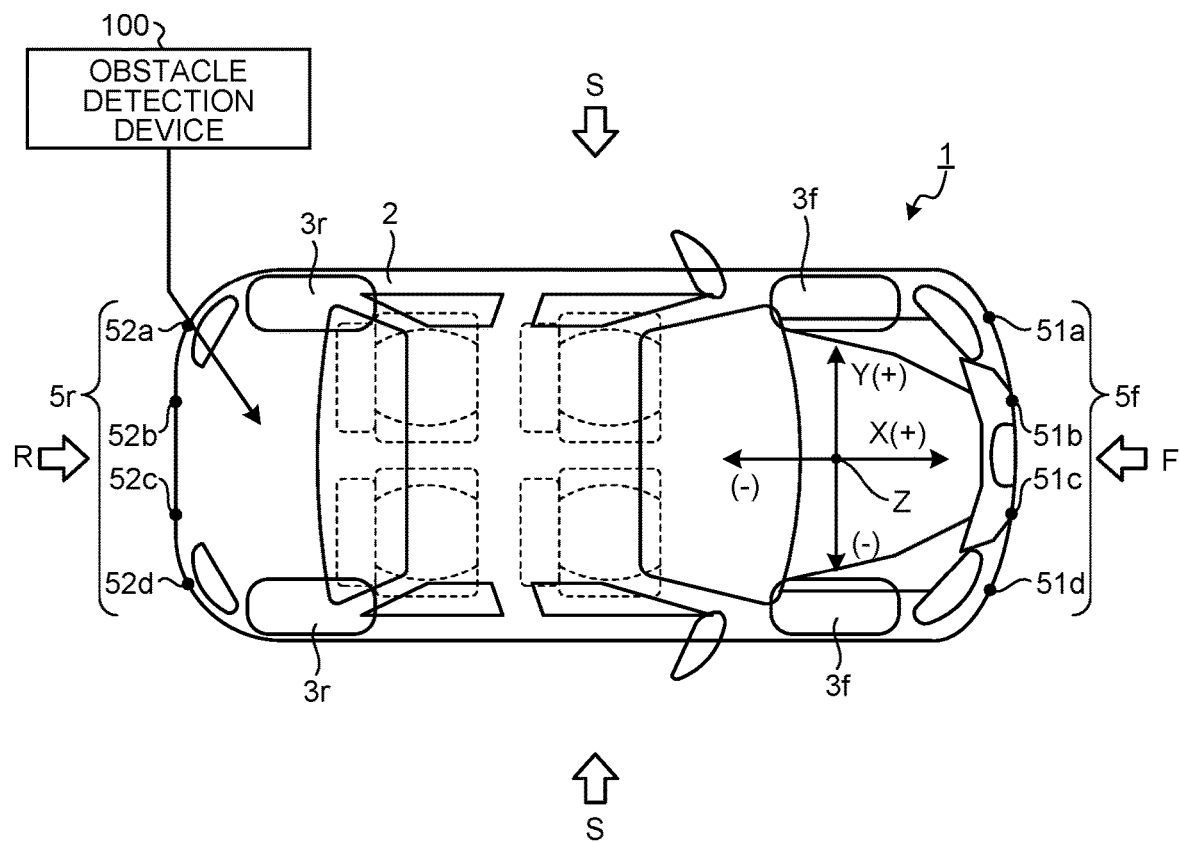
FIG. 1B is a schematic diagram illustrating an example of a vehicle including an obstacle detection device according to a first embodiment.

FIG. 1A and FIG. 1B are each a schematic diagram illustrating a vehicle 1 including an obstacle detection device 100 according to a first embodiment. As illustrated in FIG. 1A and FIG. 1B, the vehicle 1 includes a vehicle body 2, and two pairs of wheels 3 (a pair of front tires 3f and a pair of rear tires 3r) coupled to the vehicle body 2 in a traveling direction. Here, the traveling direction of the vehicle 1 can also be regarded as a predetermined direction.

The vehicle body 2 includes a front end portion F being an end portion on the front tire 3f side, a rear end portion R being an end portion on the rear tire 3r side, and a side end portion S being an end portion in a width direction of the vehicle body 2 that exists between the front tires 3f and the rear tires 3r. The vehicle body 2 has an approximately-rectangular shape in a top view. In the approximately-rectangular shape, each of four corner portions can also be regarded as an end portion.

As illustrated in FIG. 1A, a front bumper 4f is provided near a lower end of the vehicle body 2 in the front end portion F of the vehicle body 2, and a rear bumper 4r is provided near a lower end of the vehicle body 2 in the rear end portion R of the vehicle body 2. As illustrated in FIG. 1B, the front bumper 4f covers the entire front surface and a part of a side surface in the front end portion F of the vehicle body 2, and the rear bumper 4r covers the entire rear surface and a part of a side surface in the rear end portion R of the vehicle body 2. The front bumper 4f and the rear bumper 4r constitute a pair of bumpers 4.

A wave transmission/reception unit 5 is arranged at a predetermined end portion of the vehicle body 2. The wave transmission/reception unit 5 serving as a wave transmission unit transmits sound waves and receives reflected sound waves of transmission sound waves as a wave reception unit. The wave transmission/reception unit 5 at least includes a wave transmission/reception unit 5f arranged in the front end portion F and a wave transmission/reception unit 5r arranged in the rear end portion R.

The wave transmission/reception unit 5f is arranged on the front bumper 4f, and the wave transmission/reception unit 5r is arranged on the rear bumper 4r. The wave transmission/reception unit 5 may be arranged in at least one of both side end portions S of the vehicle 1, or may arranged in at least one of the four corner portions of the vehicle 1.

The wave transmission/reception unit 5f includes wave transmission/reception devices 51a to 51d. However, the number of wave transmission/reception devices 51 is not limited to four, but is optional. The wave transmission/reception devices 51a to 51d may be arranged on the front bumper 4f at a predetermined distance interval.

Each of the wave transmission/reception devices 51a to 51d transmits a transmission sound wave at a predetermined cycle and receives a reflected sound wave at a predetermined cycle being a timing different from the timing of wave transmission. In other words, each of the wave transmission/reception devices 51a to 51d is configured to alternate a wave transmission timing and a wave reception timing. The wave transmission/reception devices 51a to 51d may be configured in such a manner that, when either one of the neighboring wave transmission/reception devices 51a and 51b, either one of the neighboring wave transmission/reception devices 51b and 51c, and either one of the wave transmission/reception devices 51c and 51d are in a wave transmission state, the other wave transmission/reception devices are in a wave reception state.

The wave transmission/reception unit 5r includes wave transmission/reception devices 52a to 52d. However, the number of wave transmission/reception devices 52 is not limited to four, but is optional. The wave transmission/reception devices 52a to 52d may be arranged on the rear bumper 4r at a predetermined distance interval. Note that the predetermined distance interval of the wave transmission/reception devices 51a to 51d and the predetermined distance interval of the wave transmission/reception devices 52a to 52d may be the same, and may be different.

Each of the wave transmission/reception devices 52a to 52d transmits a transmission sound wave at a predetermined cycle, and receives a reflected sound wave at a predetermined cycle being a timing different from the timing of wave transmission. In other words, each of the wave transmission/reception devices 52a to 52d is configured to alternate a wave transmission timing and a wave reception timing. The wave transmission/reception devices 52a to 52d may be configured in such a manner that, when either one of the neighboring wave transmission/reception devices 52a and 52b, either one of the neighboring wave transmission/reception devices 52b and 52c, and either one of the wave transmission/reception devices 52c and 52d are in a wave transmission state, the other wave transmission/reception devices are in a wave reception state.

The wave transmission/reception unit 5 having the above-described configuration includes the obstacle detection device 100. The obstacle detection device 100 is mounted on the vehicle body 2, and detects an obstacle existing around the vehicle 1 by using sound waves such as ultrasound waves.

The vehicle 1 can drive in the traveling direction by using the wheels 3 arranged in the traveling direction. The wheels 3 include a pair of wheels 3 (front tires 3f) arranged in an anterior half portion of the vehicle 1, and a pair of wheels 3 (rear tires 3r) arranged in a posterior half portion of the vehicle 1. The vehicle 1 can move forward or backward in the traveling direction by the switching of gears or the like, and can also turn right or left by changing the steering angle of the front tires 3f. Here, the vehicle 1 is a four-wheel vehicle having four wheels, but the vehicle 1 is not limited to this. The vehicle 1 may be a three-wheel vehicle, two-wheel vehicle, or may be a vehicle that uses five or more wheels.

In this specification, the traveling direction of the vehicle 1, that is, the arrangement direction of two pairs of wheels 3 is regarded as an X direction. Additionally, the front tire 3f side is assumed to have a positive value, and the rear tire 3r side is assumed to have a negative value. Moreover, a direction orthogonal to the X direction on a horizontal plane is regarded as a Y direction, and the left side with respect to the positive side of the X direction is assumed to have a positive value of the Y direction, and the right side is assumed to have a negative value. In addition, an up-down direction orthogonal to the X direction and the Y direction is regarded as a Z direction, and an up direction is assumed to have a positive value, and a lower direction is assumed to have a negative value.

Configuration of Obstacle Detection Device

Figure 2:
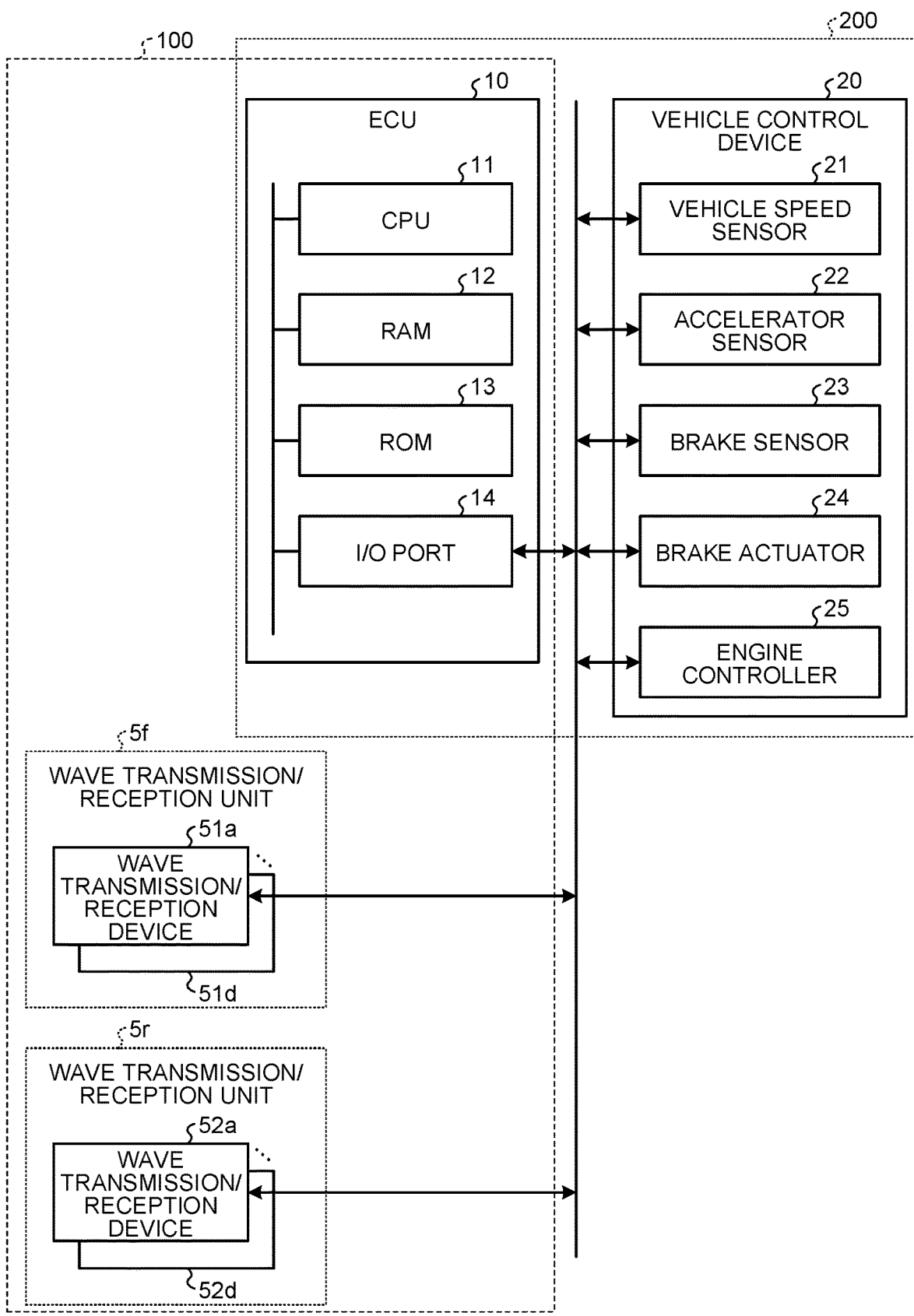
FIG. 2 is a block diagram illustrating an example of a configuration of the vehicle including the obstacle detection device according to the first embodiment.

FIG. 2 is a block diagram illustrating a configuration of the vehicle 1 including the obstacle detection device 100 according to the first embodiment. As illustrated in FIG. 2, the vehicle 1 includes the obstacle detection device 100 and a drive assist device 200.

The obstacle detection device 100 includes the wave transmission/reception units 5f and 5r, and an Electronic Control Unit (ECU) 10, and detects an obstacle existing near the vehicle 1. The drive assist device 200 includes the ECU 10 and a vehicle control device 20, and assists a driver in driving the vehicle 1.

The ECU 10 serving as a control circuit formed as a computer including a Central Processing Unit (CPU) 11, a Random Access Memory (RAM) 12, and a Read Only Memory (ROM) 13. In addition, the ECU 10 includes an Input/Output (I/O) port 14 through which various types of information can be transmitted to and received from each component of the vehicle control device 20 and the wave transmission/reception units 5f and 5r.

Each component of the RAM 12, the ROM 13, and the I/O port 14 of the ECU 10 is configured to be able to transmit and receive various types of information to and from the CPU 11 via an internal bus.

In a case where an obstacle exists near the vehicle 1, the ECU 10 detects the obstacle on the basis of transmission sound waves and reflected sound waves in the wave transmission/reception units 5f and 5r, by the CPU 11 executing a program installed on the ROM 13. In addition, on the basis of a detection result of the obstacle, the ECU 10 outputs a signal for issuing an instruction to control the vehicle 1, to the vehicle control device 20.

The vehicle control device 20 includes a vehicle speed sensor 21, an accelerator sensor 22, a brake sensor 23, a brake actuator 24, and an engine controller 25.

The vehicle speed sensor 21 detects the speed of the vehicle. The accelerator sensor 22 detects an operation amount of an accelerator pedal operated by a driver. The brake sensor 23 detects an operation amount of a brake pedal operated by a driver.

The brake actuator 24 serving as a braking unit (an example of a braking device) applies braking to at least either of the front tires 3f and the rear tires 3r. In normal driving, the engine controller 25 serving as a drive unit (an example of a drive device) executes acceleration and deceleration control of the vehicle 1 by performing output control of an engine (not illustrated) on the basis of a detection result of the accelerator sensor 22.

The vehicle control device 20 acquires information indicating a state of each component of the vehicle 1 by the vehicle speed sensor 21, the accelerator sensor 22, the brake sensor 23, and so forth. By controlling at least either of the brake actuator 24 and the engine controller 25 on the basis of these pieces of information and signals received from the ECU 10, the vehicle control device 20 controls the vehicle 1 to avoid an obstacle detected by the ECU 10. Here, the vehicle 1 is assumed to include an engine and the engine controller 25, but the vehicle 1 is not limited to this. The vehicle control device 20 may control the vehicle 1 to avoid an obstacle detected by the ECU 10, by including an electric motor and a motor controller that controls the electric motor, and controlling at least either of the brake actuator 24 and the motor controller.

In other words, the vehicle control device 20 achieves collision avoidance between the vehicle 1 and an obstacle by controlling the brake actuator 24 and applying braking to the vehicle body 2. In place of or in addition to this, the vehicle control device 20 may achieve collision avoidance between the vehicle 1 and an obstacle by suppressing engine output for several seconds by the engine controller 25, and suppressing acceleration of the vehicle body 2.

In addition, in some cases, an accelerator pedal of the vehicle 1 can be an accelerator pedal of an electronically-controlled type, and the vehicle control device 20 can include a mechanism of controlling an opening angle of the accelerator pedal. In such cases, the vehicle control device 20 may achieve collision avoidance between the vehicle 1 and an obstacle by controlling an opening angle of the accelerator pedal by an accelerator pedal control mechanism serving as a drive unit, and suppressing acceleration of the vehicle body 2, in place of or in addition to the above-described suppression of engine output.

In this manner, the vehicle control device 20 may be configured to cause the drive assist device 200 to function as a pedal operation error-induced acceleration suppression device, a collision damage reduction brake, or the like, by including at least either of a function of applying braking to the vehicle body 2, and a function of suppressing acceleration of the vehicle body 2. The pedal operation error-induced acceleration suppression device, the collision damage reduction brake, and so forth correspond to a function of assisting a driver in driving in such a manner as to avoid collision with a nearby obstacle, in a case where the driver mistakenly operates an accelerator pedal too much.

Position Identification of Obstacle Detection Device

Next, a method by which the obstacle detection device 100 of the first embodiment identifies a position and an angle of an obstacle will be described by using FIGS. 3 and 4. Note that the position of the obstacle is a position in a top view. In other words, the position of the obstacle refers to a position on a plane in the X direction and the Y direction, that is, an XY plane. Moreover, the angle of the obstacle refers to an angle in a normal direction of a surface of the obstacle that reflects transmission sound waves, with respect to the traveling direction of the vehicle 1. This angle is an angle in the top view. In other words, this angle refers to an angle on the XY plane.

Figure 3:
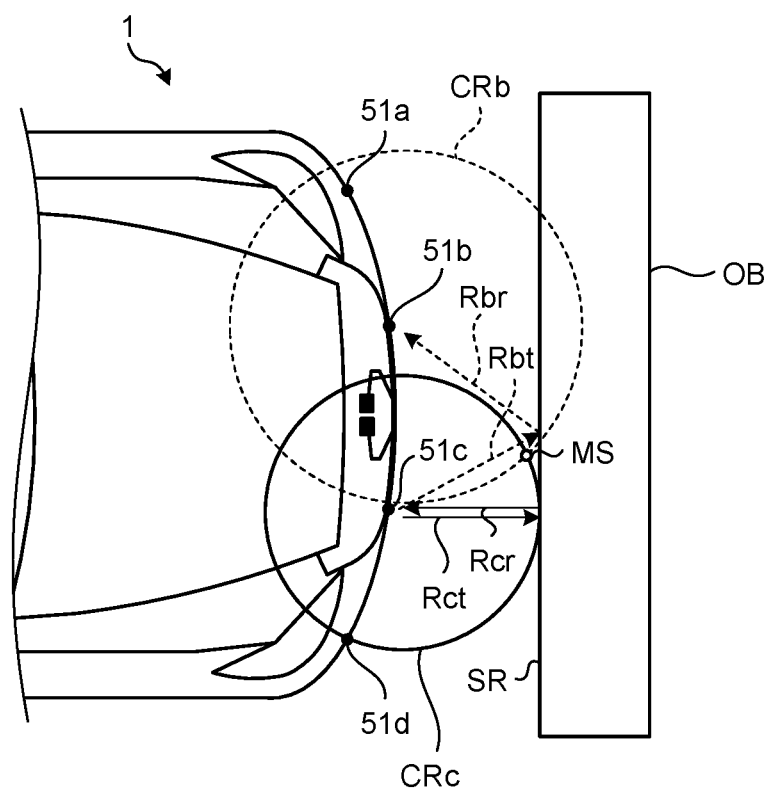
FIG. 3 is a schematic diagram illustrating an example of a case where the obstacle detection device according to the first embodiment identifies a position of an obstacle.
Figure 4:
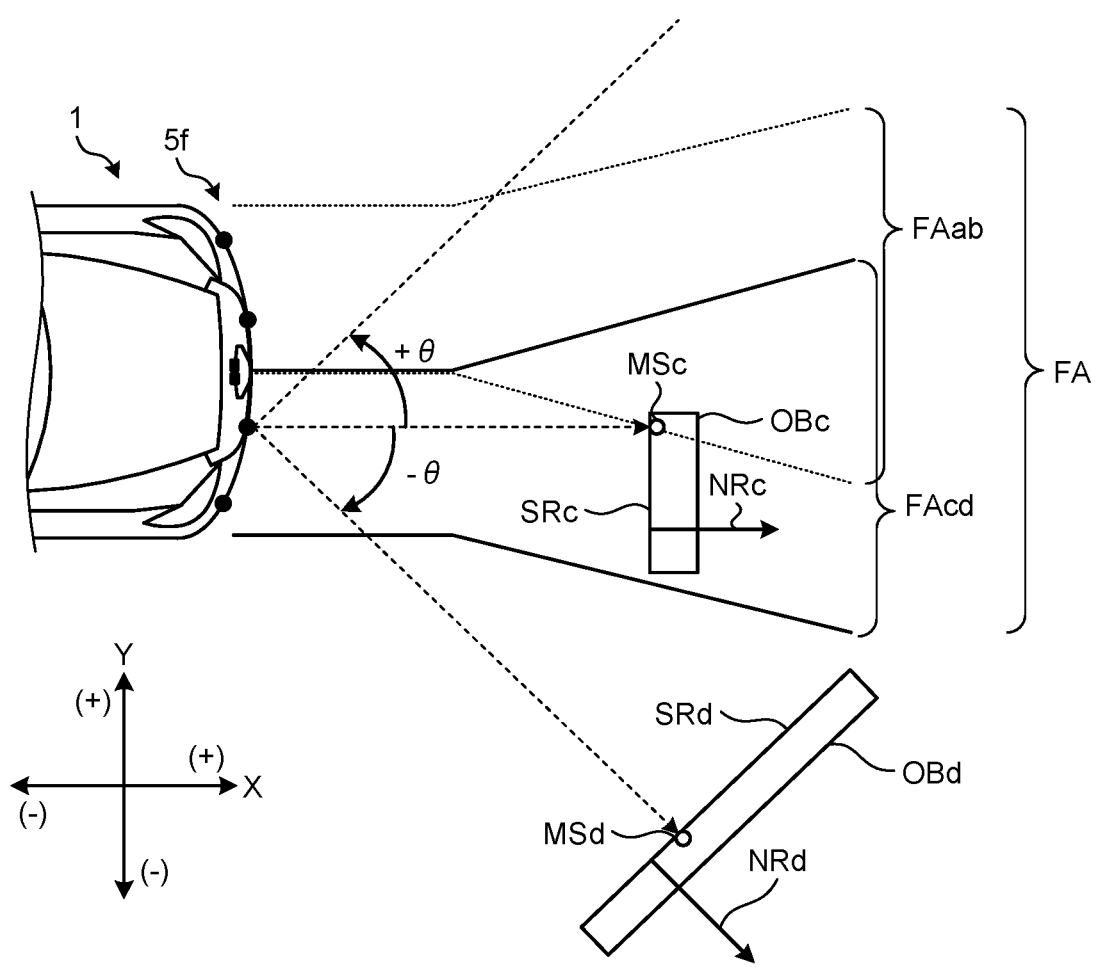
FIG. 4 is a schematic diagram illustrating an example of a case where the obstacle detection device according to the first embodiment identifies an angle of an obstacle.

In FIGS. 3 and 4, the description will be given of a case where the obstacle detection device 100 identifies a position and an angle of an obstacle existing in front of the vehicle 1, on the basis of transmission sound waves and reflected sound waves of the wave transmission/reception unit 5f in the front end portion of the vehicle body 2. Note that the identification of a position and an angle of an obstacle existing in the rear of the vehicle 1, which is performed on the basis of transmission sound waves and reflected sound waves of the wave transmission/reception unit 5r in the rear end portion of the vehicle body 2, can also be executed similarly to the method to be described below.

FIG. 3 is a schematic diagram of a case where the obstacle detection device 100 according to the first embodiment identifies a position of an obstacle OB.

As illustrated in FIG. 3, the obstacle OB is assumed to exist in front of the vehicle 1. The obstacle OB has a surface SR serving as a first surface facing the side of the vehicle 1. The obstacle detection device 100 detects the obstacle OB from transmission sound waves and reflected sound waves obtained by the wave transmission/reception devices 51a to 51d of the wave transmission/reception unit 5f.

At this time, the position of the obstacle OB is identified on the basis of transmission sound waves and reflected sound waves of neighboring two wave transmission/reception devices 51 of a plurality of wave transmission/reception devices 51 included in the wave transmission/reception unit 5f. FIG. 3 illustrates a case where the neighboring two wave transmission/reception devices 51b and 51c are used.

The wave transmission/reception device 51c transmits transmission sound waves toward the vehicle 1 at an angle within a predetermined range. Here, the angle in the predetermined range is an angle on the XY plane, and is an angle with respect to the traveling direction, namely, X direction. In these transmission sound waves, the transmission sound waves Rct and Rbt will be described.

The transmission sound wave Rct is reflected on the surface SR of the obstacle OB. A reflected sound wave Rcr being a reflected sound wave of the transmission sound wave Rct reaches the wave transmission/reception device 51c through the same route as the transmission sound wave Rct, and is then received by the wave transmission/reception device 51c.

The obstacle detection device 100 calculates a flight distance related to the transmission sound wave Rct and the reflected sound wave Rcr, on the basis of a flight time from a wave transmission timing of the transmission sound wave Rct to a wave reception timing of the reflected sound wave Rcr, and a sound speed, and sets a value obtained by dividing this flight distance by two, as a distance from the wave transmission/reception device 51c to the obstacle OB. The obstacle detection device 100 can set a virtual circle CRc having a radius corresponding to the distance from the wave transmission/reception device 51c to the obstacle OB.

Next, the transmission sound wave Rbt is reflected on the surface SR of the obstacle OB and then reaches the wave transmission/reception device 51b as a reflected sound wave Rbr. Here, an incidence angle of the transmission sound wave Rbt with respect to the normal direction of the surface SR, and a reflection angle of the reflected sound wave Rbr with respect to the normal direction of the surface SR are identical to each other.

The obstacle detection device 100 calculates a flight distance related to the transmission sound wave Rbt and the reflected sound wave Rbr, on the basis of a flight time from a wave transmission timing of the transmission sound wave Rbt to a wave reception timing of the reflected sound wave Rbr, and a sound speed, and sets a value obtained by subtracting a value of the radius of the virtual circle CRc from this flight distance, as a distance from a reflected position of the reflected sound wave Rbr on the surface SR of the obstacle OB to the wave transmission/reception device 51b being a wave reception position of the reflected sound wave Rbr. Here, the obstacle detection device 100 can set a virtual circle CRb having a radius corresponding to the distance from the reflected position of the reflected sound wave Rbr on the surface SR of the obstacle OB to the wave transmission/reception device 51b being the wave reception position of the reflected sound wave Rbr.

Out of intersection points of the two virtual circles CRc and CRb, the obstacle detection device 100 sets an intersection point on the wave transmission direction side of the transmission sound waves Rct and Rbt, as a distance measurement point MS indicating a position coordinate of the obstacle OB. The position of the obstacle OB can be thereby identified on the basis of the transmission sound waves Rct and Rbt and the reflected sound waves Rcr and Rbr of the wave transmission/reception unit 5f.

FIG. 4 is a schematic diagram of a case where the obstacle detection device 100 according to the first embodiment identifies angles of obstacles OBc and OBd.

As illustrated in FIG. 4, it is assumed that the two obstacles OBc and OBd exist in front of the vehicle 1. The obstacle detection device 100 identifies angles of the obstacles OBc and OBd with respect to the traveling direction of the vehicle 1, on the basis of the respective positions of the obstacles OBc and OBd.

Here, a facing object region FA to be used in determination as to whether or not the obstacles OBc and OBd face the vehicle 1 is set for the wave transmission/reception unit 5f of the obstacle detection device 100. The facing object region FA includes facing object regions FAab and FAcd.

The facing object region FAab is set for the wave transmission/reception devices 51a and 51b in the wave transmission/reception devices 51a to 51d of the wave transmission/reception unit 5f. In a case where an obstacle positioned within the facing object region FAab is detected on the basis of transmission sound waves and reflected sound waves of the wave transmission/reception devices 51a and 51b, the obstacle detection device 100 determines that the obstacle faces the vehicle 1.

The facing object region FAcd is set for the wave transmission/reception devices 51c and 51d in the wave transmission/reception devices 51a to 51d of the wave transmission/reception unit 5f. In a case where an obstacle positioned within the facing object region FAcd is detected on the basis of transmission sound waves and reflected sound waves of the wave transmission/reception devices 51c and 51d, the obstacle detection device 100 determines that the obstacle faces the vehicle 1.

In other words, in a case where an obstacle positioned within the facing object region FA including a region where the facing object regions FAab and FAcd overlap with each other, the obstacle detection device 100 determines that the obstacle faces the vehicle 1.

Next, the obstacle detection device 100 identifies the position of the obstacle OBc similarly to the foregoing, and calculates a distance measurement point MSc indicating a position coordinate of the obstacle OBc. In addition, the obstacle detection device 100 determines whether or not the calculated distance measurement point MSc falls within the facing object region FA.

Moreover, on the basis of a determination as to whether or not the distance measurement point MSc falls within the facing object region FA, the obstacle detection device 100 determines an angle in a normal direction NRc of a surface SRc of the obstacle OBc that serves as a first surface facing the vehicle 1 side, with respect to the X direction of the vehicle 1.

In FIG. 4, the distance measurement point MSc falls within the facing object region FA. In this case, the obstacle detection device 100 determines that the surface SRc of the obstacle OBc faces the vehicle 1. The obstacle detection device 100 accordingly sets 0° with respect to the X direction of the vehicle 1, as an angle in the normal direction NRc of the surface SRc of the obstacle OBc. In this manner, the obstacle detection device 100 sets an angle of the obstacle OBc on the basis of the position of the obstacle OBc.

In FIG. 4, a distance measurement point MSd falls outside the facing object region FA. In this case, the obstacle detection device 100 sets a value inclined in the X direction of the vehicle 1 at a predetermined angle, as an angle in a normal direction NRd of a surface SRd of the obstacle OBd. The value of this angle is an angle formed by a line segment from a center position to the distance measurement point MSd with respect to the X direction of the vehicle 1. In this manner, the obstacle detection device 100 sets an angle of the obstacle OBd on the basis of the position of the obstacle OBd.

In FIG. 4, the normal direction NRd of the surface SRd of the obstacle OBd is inclined at a predetermined angle toward the right side (toward a −Y direction) with respect to a +X direction of the vehicle 1. Here, the angle in the normal direction NRd has a positive value in counterclockwise rotation and has a negative value in clockwise rotation with respect to the traveling direction (+X direction) of the vehicle 1. Thus, an angle in the normal direction NRd in FIG. 4 is an angle −θ (θ itself has a positive value) having a negative value. In other words, as the distance measurement point MSd of the obstacle OBd deviates from the facing object region FA in the −Y direction of the vehicle 1, the angle −θ becomes smaller and an absolute value of the angle −θ becomes larger.

In addition, in a case where a distance measurement point indicating a position of a predetermined obstacle (not illustrated) deviates outward from the facing object region FA toward the +Y direction side of the vehicle 1, that is, in a case where the obstacle is positioned on the left front side of the vehicle 1, a normal direction of a surface of the obstacle that faces the vehicle 1 side is inclined at a predetermined angle leftward in the +X direction of the vehicle 1, that is, inclined toward the left side (toward +Y direction) in the +X direction of the vehicle 1. In addition, an angle in the normal direction at this time is an angle +θ (θ itself has a positive value) having a positive value. In other words, as the distance measurement point of the above-described obstacle deviates outward from the facing object region FA in the +Y direction of the vehicle 1, an angle +θ becomes larger as a positive value and an absolute value of the angle +θ becomes larger as well.

Determination of Obstacle Detection Device

Figure 5:
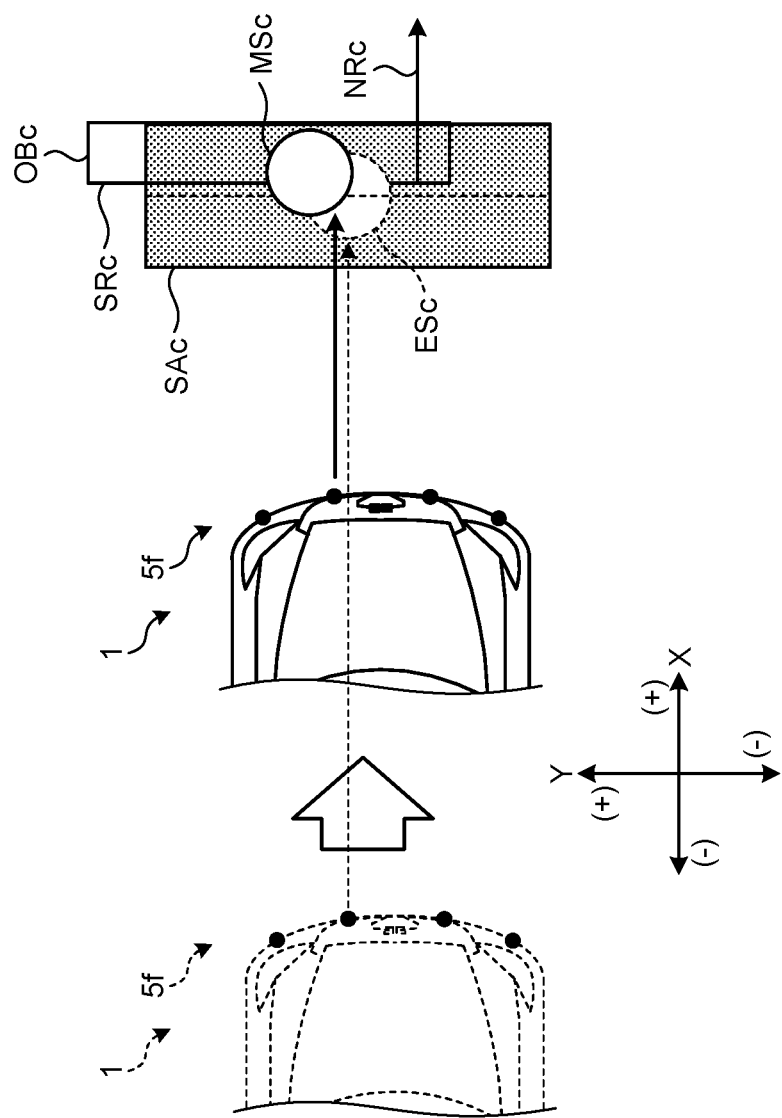
FIG. 5 is a schematic diagram illustrating an example of a case where the obstacle detection device according to the first embodiment performs same object determination on an obstacle facing a vehicle.

FIG. 5 is a schematic diagram illustrating an operation in which the obstacle detection device 100 performs same object determination on the obstacle OBc facing the vehicle 1.

The obstacle detection device 100 performs the detection of the obstacle OBc at a predetermined cycle. The obstacle detection device 100 calculates a position of the obstacle OBc as an estimated point ESc on the basis of previous data detected last time, and sets a same object determination region SAc from the estimated point ESc. Here, the same object determination region SAc is a rectangle having a pair of long sides and a pair of short sides, but the same object determination region SAc is not limited to this. The same object determination region SAc may be a square, a parallelogram, or a simple quadrangle. Alternatively, the same object determination region SAc may merely have a predetermined shape.

The previous data includes a position coordinate of the obstacle OBc and an angle of the obstacle OBc with respect to the vehicle 1 that have been calculated on the basis of transmission sound waves and reflected sound waves transmitted and received before transmission sound waves to be transmitted afterward. The obstacle detection device 100 calculates the estimated point ESc from these pieces of previous data.

The estimated point ESc is obtained by calculating a relative position from the vehicle 1 at the current time point to a coordinate of the obstacle OBc detected last time, on the basis of the coordinate of the obstacle OBc detected last time, and a moving amount and a turning angle of the vehicle 1 from the previous detection time point to the current time point. The estimated point ESc is an estimated position of an obstacle, which is supposed to be detected by transmission sound waves to be transmitted next time.

The same object determination region SAc is a rectangular region having a pair of long sides and a pair of short sides, and being centered on the calculated estimated point ESc. The length of the pair of long sides is determined depending on a distance (X direction distance) from the vehicle 1.

The same object determination region SAc is set in such a manner as to be adapted to an angle of the obstacle OBc detected and identified last time. That is, the direction of the same object determination region SAc is set in such a manner as to suit the direction of the obstacle OBc. More specifically, the same object determination region SAc is set in such a manner that the pair of long sides of the same object determination region SAc become parallel to the surface SRc of the obstacle OBc that faces the vehicle 1 side, and orthogonal to the normal direction NRc of the surface SRc of the obstacle OBc.

The obstacle detection device 100 transmits transmission sound waves for performing measurement next. If reflected sound waves are received as reception sound waves in response to the transmission sound waves, this means that an obstacle exists near the vehicle 1. However, at this time point, it is still unclear whether or not the obstacle detected this time is the same object as the obstacle OBc detected last time.

The obstacle detection device 100 calculates a position coordinate of the distance measurement point MSc indicating the position of the obstacle, on the basis of the transmission sound waves and the reflected sound waves of this time. In addition, the obstacle detection device 100 determines whether or not the distance measurement point MSc calculated this time falls within the same object determination region SAc set on the basis of the previous data.

In a case where the distance measurement point MSc calculated this time falls outside the same object determination region SAc, the obstacle detection device 100 determines that the obstacle OBc detected last time and the obstacle detected this time are not the same object, and sets a reliability RL1 as a reliability of the obstacle detected this time.

In a case where the distance measurement point MSc calculated this time falls within the same object determination region SAc, the obstacle detection device 100 determines that the obstacle OBc detected last time and the obstacle detected this time are the same object, and sets a reliability RL2 higher than the reliability RL1, as a reliability of the obstacle detected this time.

The obstacle detection device 100 performs such same object determination on detected obstacles a plurality of times until a predetermined reliability is obtained, and in a case where the predetermined reliability is obtained, the obstacle detection device 100 outputs these pieces of data to the drive assist device 200. The drive assist device 200 may perform control of the vehicle 1 on the basis of these pieces of data. In addition, to avoid collision with an obstacle, the obstacle detection device 100 may output, to the drive assist device 200, at least either of a signal for applying braking to the vehicle body 2 of the vehicle 1, and a signal for suppressing acceleration of the vehicle body 2.

The following description will be given of a case where the control of the vehicle 1 is performed assuming that the predetermined reliability is obtained in a case where determinations are made two consecutive times such that detected obstacles are the same object.

In this case, the obstacle detection device 100 detects an obstacle by transmission sound waves transmitted the first time and reflected sound waves corresponding thereto, and calculates a position coordinate and an angle of the obstacle.

Next, the obstacle detection device 100 detects an obstacle by transmission sound waves transmitted the second time and reflected sound waves corresponding thereto, and calculates a position coordinate of the obstacle.

In addition, the obstacle detection device 100 calculates an estimated point on the basis of the position coordinate and the angle of the obstacle detected by the transmission sound waves and the reflected sound waves of the first time, and sets a same object determination region on the basis of the calculated estimated point.

Next, the obstacle detection device 100 determines whether or not the position coordinate of the obstacle detected by the transmission sound waves and the reflected sound waves of the second time falls within the same object determination region that is based on the transmission sound waves and the reflected sound waves of the first time.

In a case where the position coordinate of the obstacle detected the second time falls within the same object determination region set the first time, the obstacle detection device 100 determines that obstacles detected the first time and the second time are the same object, and sets the reliability RL2 as a reliability of the obstacle detected the second time. In addition, the obstacle detection device 100 calculates an angle of the obstacle detected the second time.

Next, the obstacle detection device 100 detects an obstacle by transmission sound waves transmitted the third time, and reflected sound waves corresponding thereto, and calculates a position coordinate of the obstacle.

In addition, the obstacle detection device 100 calculates an estimated point on the basis of the position coordinate and the angle of the obstacle detected by the transmission sound waves and the reflected sound waves of the second time, and sets a same object determination region on the basis of the calculated estimated point.

Next, the obstacle detection device 100 determines whether or not the position coordinate of the obstacle detected by the transmission sound waves and the reflected sound waves of the third time falls within the same object determination region that is based on the transmission sound waves and the reflected sound waves of the second time.

In a case where the position coordinate of the obstacle detected the third time falls within the same object determination region set the second time, the obstacle detection device 100 determines that obstacles detected the second time and the third time are the same object, and sets a reliability RL3 higher than the reliability RL2, as a reliability of the obstacle detected the third time.

In this manner, in a case where determinations are made two consecutive times such that obstacles detected by the transmission sound waves and the reflected sound waves of the first to the third times are the same object, and a reliability of the obstacle detected the third time is set to the reliability RL3, the obstacle detection device 100 determines that the predetermined reliability is obtained for the obstacle. Then, on the basis of the obstacle detected the third time, the obstacle detection device 100 issues an instruction to the drive assist device 200 to perform control of the vehicle 1.

On the other hand, in a case where the position coordinate of the obstacle detected the second time falls outside the same object determination region set the first time, or in a case where the position coordinate of the obstacle detected the third time falls outside the same object determination region set the second time, the buildup of reliability is cancelled. The obstacle detection device 100 performs buildup of reliability again from the time point, and performs the same object determination until the reliability RL3 is obtained.

In other words, in a case where the position coordinate of the obstacle detected the second time falls outside the same object determination region set the first time, the obstacle detection device 100 sets the reliability RL1 lower than the reliabilities RL2 and RL3, as a reliability of the obstacle detected the second time. Then, if the obstacle detected the third time is determines to be the same object as the obstacle detected the second time, the obstacle detection device 100 sets the reliability RL2 as a reliability of the obstacle detected the third time. Thereafter, the same object determination is performed until the reliability RL3 is obtained.

In addition, in a case where the position coordinate of the obstacle detected the third time falls outside the same object determination region set the second time, the obstacle detection device 100 sets the reliability RL1 as a reliability of the obstacle detected the third time. Then, if an obstacle detected the fourth time is determines to be the same object as the obstacle detected the third time, the obstacle detection device 100 sets the reliability RL2 as a reliability of the obstacle detected the fourth time. Thereafter, the same object determination is performed until the reliability RL3 is obtained.

In this manner, the obstacle detection device 100 returns a reliability to the reliability RL1 each time the determination is made such that an obstacle detected in predetermined number of detection is not the same object as an immediately-preceding obstacle.

In other words, in a case where a reliability is the reliability RL1 and where a determination is made such that an obstacle detected this time (predetermined number of detection) is the same as an immediately-preceding obstacle, the reliability increases to the reliability RL2. In a case where a reliability is the reliability RL1 as well and where a determination is made such that an obstacle detected this time (predetermined number of detection) is not the same as an immediately-preceding obstacle, the reliability remains at the reliability RL1. Next, in a case where a reliability is the reliability RL2 and where a determination is made such that an obstacle detected this time (predetermined number of detection) is the same as an immediately-preceding obstacle, the reliability increases to the reliability RL3. In a case where a reliability is the reliability RL2 as well and where a determination is made such that an obstacle detected this time (predetermined number of detection) is not the same as an immediately-preceding obstacle, the reliability returns to the reliability RL1. Next, in a case where a reliability is the reliability RL3 and where a determination is made such that an obstacle detected this time (predetermined number of detection) is the same as an immediately-preceding obstacle, the reliability remains at the reliability RL3. In a case where a reliability is the reliability RL3 as well and where a determination is made such that an obstacle detected this time (predetermined number of detection) is not the same as an immediately-preceding obstacle, the reliability returns to the reliability RL1.

Here, the obstacle detection device 100 includes three levels of reliabilities corresponding to the reliability RL1, the reliability RL2, and the reliability RL3, but the reliabilities are not limited to these, and the obstacle detection device 100 may include two levels of reliabilities corresponding to the reliability RL1 and the reliability RL2. In this case, in a case where a reliability is the reliability RL1 and where a determination is made such that an obstacle detected this time (predetermined number of detection) is the same as an immediately-preceding obstacle, the reliability increases to the reliability RL2. In a case where a reliability is the reliability RL1 as well and where a determination is made such that an obstacle detected this time (predetermined number of detection) is not the same as an immediately-preceding obstacle, the reliability remains at the reliability RL1. Next, in a case where a reliability is the reliability RL2 and where a determination is made such that an obstacle detected this time (predetermined number of detection) is the same as an immediately-preceding obstacle, the reliability may remain at the reliability RL2. In a case where a reliability is the reliability RL2 as well and where a determination is made such an obstacle detected this time (predetermined number of detection) is not the same as an immediately-preceding obstacle, the reliability may return to the reliability RL1.

Figure 6:
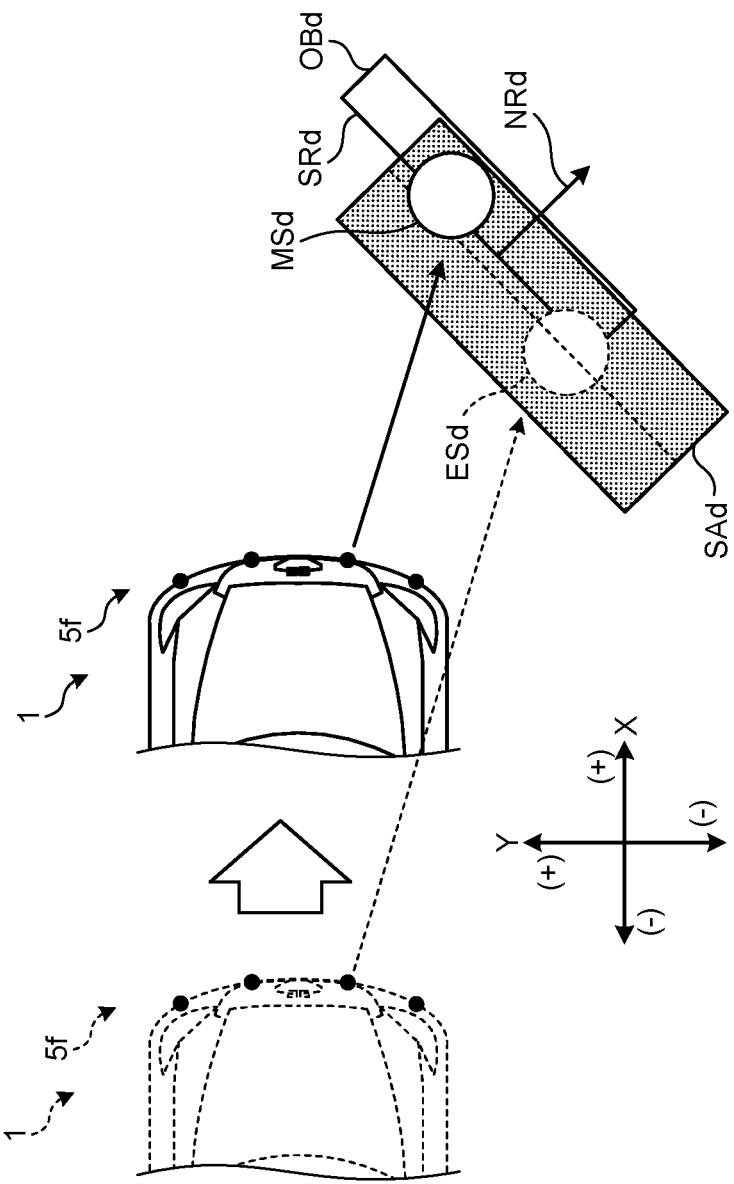
FIG. 6 is a schematic diagram illustrating an example of a case where the obstacle detection device according to the first embodiment performs same object determination on and obstacle obliquely-arranged with respect to a vehicle.

FIG. 6 is a schematic diagram illustrating a case where the obstacle detection device 100 according to the first embodiment performs same object determination on the obstacle OBd obliquely-arranged with respect to the vehicle 1. As illustrated in FIG. 6, the same object determination of the obstacle OBd is also performed similarly to the above-described same object determination of the obstacle OBc.

In other words, when performing the same object determination, the obstacle detection device 100 calculates an estimated point ESd on the basis of previous data, and sets a same object determination region SAd from the estimated point ESd.

Here, the same object determination region SAd is also set in such a manner as to be adapted to an angle of the obstacle OBd detected and identified last time. That is, the same object determination region SAd is set in such a manner that the pair of long sides of the same object determination region SAd is parallel to the surface SRd of the obstacle OBd that faces the vehicle 1 side and are orthogonal to the normal direction NRd of the surface SRd of the obstacle OBd.

In addition, the obstacle detection device 100 transmits transmission sound waves for performing measurement this time. If reflected sound waves are received in response to the transmission sound waves, this means that an obstacle exists near the vehicle 1. The obstacle detection device 100 calculates a position coordinate of the distance measurement point MSd of the obstacle on the basis of the transmission sound waves and the reflected sound waves of this time, and determines whether or not the distance measurement point MSd falls within the same object determination region SAd.

Here, if the obstacle OBd is obliquely arranged with respect to the vehicle 1, a position on the surface SRd of the obstacle OBd that faces the vehicle 1 side, at which the transmission sound waves of this time are reflected, namely, the distance measurement point MSd moves along with the movement of the vehicle 1. If the vehicle 1 moves closer to the obstacle OBd, the distance measurement point MSd shifts toward the rear side of the surface SRd of the obstacle OBd, that is, a side getting away from the vehicle 1.

As described above, the same object determination region SAd is set in such a manner as to be adapted to the angle of the obstacle OBd. Thus, if an obstacle detected by transmission sound waves and reflected sound waves of this time is the same object as the obstacle OBd detected last time, the distance measurement point MSd is highly likely to stay within the same object determination region SAd even if the distance measurement point MSd shifts toward the rear side.

For this reason, the depth, that is, the distance between a pair of short sides of the same object determination region SAc or SAd functions as a threshold value of same object determination.

In a case where the distance measurement point MSd falls outside the same object determination region SAd, the obstacle detection device 100 sets the reliability RL1 as a reliability of the obstacle detected this time, and in a case where the distance measurement point MSd falls within the same object determination region SAd, the obstacle detection device 100 sets the reliability RL2 as a reliability of the obstacle detected this time.

The obstacle detection device 100 performs such same object determination on detected obstacles a plurality of times until a predetermined reliability is obtained, and in a case where the predetermined reliability is obtained, the obstacle detection device 100 causes the vehicle control device 20 of the drive assist device 200 to perform control of the vehicle 1.

In other words, the wave transmission/reception unit 5f transmits a first transmission sound wave and receives, as a reception sound wave, a first reflected sound wave corresponding to the first transmission sound wave.

On the basis of the first transmission sound wave and the first reflected sound wave, the obstacle detection device 100 obtains a first angle in a normal direction of a surface of a first obstacle that faces the vehicle 1 side, with respect to the X direction of the vehicle 1, and obtains a position of the first obstacle. In addition, the obstacle detection device 100 sets a first same object determination region adapted to the first angle of the first obstacle, on the basis of the first angle and the position of the first obstacle.

Next, the wave transmission/reception unit 5f transmits a second transmission sound wave and receives, as a reception sound wave, a second reflected sound wave corresponding to the second transmission sound wave.

On the basis of the second transmission sound wave and the second reflected sound wave, the obstacle detection device 100 obtains a second angle in a normal direction of a surface of a second obstacle that faces the vehicle 1 side, with respect to the X direction of the vehicle 1, and obtains a position of the second obstacle.

In addition, in a case where the position of the second obstacle falls within the first same object determination region, the obstacle detection device 100 sets a reliability of the second obstacle to the reliability RL2 higher than the reliability RL1.

In addition, the obstacle detection device 100 sets a second same object determination region adapted to the second angle of the second obstacle, on the basis of the second angle and the position of the second obstacle.

Next, the wave transmission/reception unit 5f transmits a third transmission sound wave and receives, as a reception sound wave, a third reflected sound wave corresponding to the third transmission sound wave.

The obstacle detection device 100 obtains a position of a third obstacle on the basis of the third transmission sound wave and the third reflected sound wave.

In a case where the position of the third obstacle falls within the second same object determination region, the obstacle detection device 100 sets a reliability of the third obstacle to the reliability RL3 higher than the reliability RL2. In addition, in a case where the reliability of the third obstacle is the reliability RL3, the obstacle detection device 100 outputs a signal in such a manner as to apply braking to the vehicle body 2 and/or suppress acceleration of the vehicle body 2, on the basis of the position of the third obstacle.

In a case where the position of the third obstacle falls outside the second same object determination region, the obstacle detection device 100 sets a reliability of the third obstacle to the reliability RL1. In addition, in a case where the reliability of the third obstacle is the reliability RL1, the obstacle detection device 100 outputs a signal in such a manner as not to apply braking to the vehicle body 2 and/or not to suppress acceleration of the vehicle body 2, on the basis of the position of the third obstacle. That is, the obstacle detection device 100 outputs a signal to the vehicle control device 20 in such a manner as to cause the vehicle 1 to normally drive.

Figure 9:
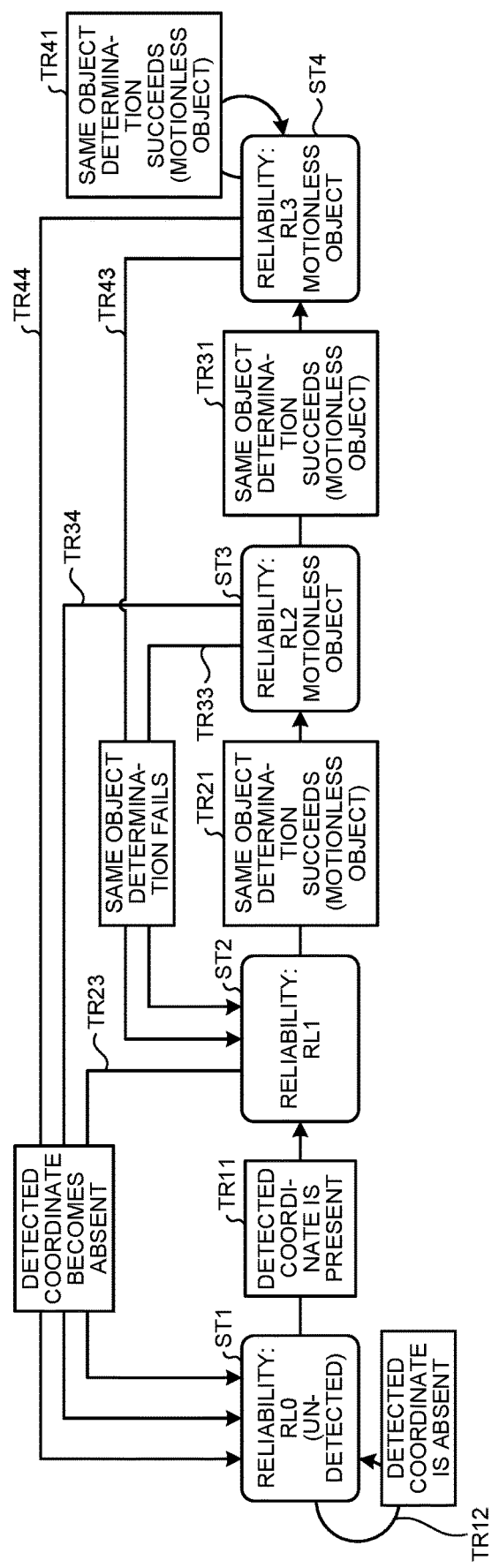
FIG. 9 is a state transition diagram illustrating a state transition related to the reliability of an obstacle detected by the obstacle detection device according to the first embodiment.

FIG. 9 is a state transition diagram illustrating a state transition related to the reliability of an obstacle detected by the obstacle detection device 100. First of all, in a case where a detected coordinate of an obstacle is absent, the obstacle detection device 100 sets a reliability to the lowest reliability RL0 (ST1). In ST1, in a case where a detected coordinate is continuously absent (TR12), the state remains in the state of ST1. In ST1, in a case where a detected coordinate is present (TR11), a reliability is set to a reliability RL1 higher than the reliability RL0 (ST2). In ST2, as described by using FIGS. 5 and 6, in a case where same object determination succeeds (TR21), a reliability is set to the reliability RL2 higher than the reliability RL1 (ST3). In ST2, in a case where a detected coordinate becomes absent (TR23), the state returns to ST1. In ST3, as described by using FIGS. 5 and 6, in a case where same object determination succeeds (TR31), a reliability is set to the reliability RL3 higher than the reliability RL2 (ST4). In ST3, in a case where a detected coordinate becomes absent (TR34), the state returns to ST1. In ST3, in a case where a detected coordinate is present but same object determination does not succeed (TR33), the state returns to ST2. In ST4, as described by using FIGS. 5 and 6, in a case where same object determination succeeds (TR41), a reliability remains at the reliability RL3 (ST4). In ST4, in a case where a detected coordinate becomes absent (TR44), the state returns to ST1. In ST4, in a case where a detected coordinate is present but same object determination does not succeed (TR43), the state returns to ST2.

Processing of Obstacle Detection Device

Figure 7:
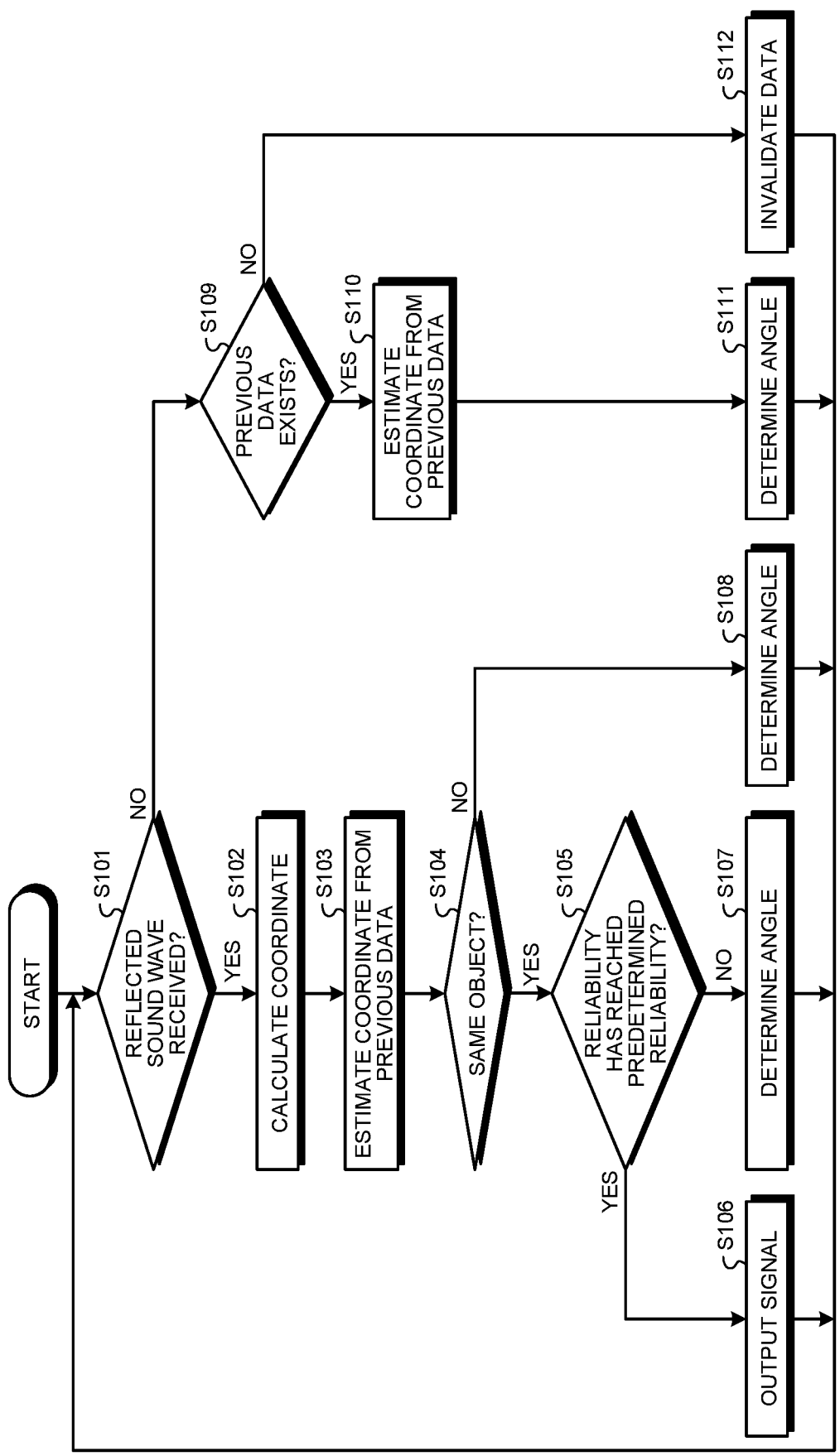
FIG. 7 is a flowchart illustrating an example of a procedure of processing in the obstacle detection device according to the first embodiment.

Next, processing in the obstacle detection device 100 of the first embodiment will be described by using FIG. 7. FIG. 7 is a flowchart illustrating a procedure of processing in the obstacle detection device 100 according to the first embodiment.

As illustrated in FIG. 7, the obstacle detection device 100 determines whether either of the wave transmission/reception devices 51 and 52 of the wave transmission/reception unit 5 has received a reflected sound wave corresponding to a transmission sound wave (Step S101).

In a case where either of the wave transmission/reception devices 51 and 52 has received a reflected sound wave (Step S101: Yes), the obstacle detection device 100 calculates a position coordinate of an obstacle that has reflected the transmission sound wave, on the basis of the transmission sound wave and the reflected sound wave (Step S102).

The obstacle detection device 100 calculates an estimated point by estimating a position coordinate estimated in a case where an obstacle detected last time is detected again by the transmission sound wave and the reflected sound wave transmitted and received this time, from a position coordinate of an obstacle detected on the basis of a transmission sound wave and a reflected sound wave transmitted and received last time (Step S103).

Note that, in a case where a reflected sound wave corresponding to a transmission sound wave transmitted last time is not obtained, that is, in a case where an obstacle is not detected by a transmission sound wave transmitted last time, the obstacle detection device 100 may calculate an estimated point from a position coordinate of an obstacle detected on the basis of a transmission sound wave and a reflected sound wave transmitted and received the second last time.

The obstacle detection device 100 performs same object determination on an obstacle detected last time or the second last time, and an obstacle detected this time, by determining whether or not the position coordinate calculated in the processing in Step S102 falls within a same object determination region set on the basis of the estimated point calculated in Step S103 (Step S104).

In a case where a determination is made such that the obstacle detected last time or the second last time and the obstacle detected this time are the same object (Step S104: Yes), the obstacle detection device 100 determines whether or not a reliability of the obstacle detected this time has reached a predetermined reliability (Step S105).

That is, in the above-described example, the obstacle detection device 100 determines whether or not determinations are made two consecutive times such that obstacles are the same object in the same object determination processing in Step S104 and the reliability of the obstacle detected this time has reached the reliability RL3. In other words, in the above-described example, the predetermined reliability in Step S105 is set to the reliability RL3.

In a case where the reliability of the obstacle detected this time has not reached the predetermined reliability (Step S105: No), the obstacle detection device 100 determines an angle of the obstacle detected this time, on the basis of the position coordinate calculated in the processing in Step S102 for the obstacle detected this time (Step S107).

That is, the obstacle detection device 100 determines an angle of the obstacle detected this time, on the basis of whether or not the position coordinate of the obstacle detected this time falls within the facing object region FA, and a distance by which the position coordinate deviates from the facing object region FA, and so forth.

Then, the obstacle detection device 100 returns the processing to the processing in Step S101.

In the processing in Step S104, in a case where a determination is made such that the obstacle detected last time or the second last time and the obstacle detected this time are not the same object (Step S104: No), the obstacle detection device 100 determines an angle of the obstacle detected this time, on the basis of the position coordinate calculated in the processing in Step S102 for the obstacle detected this time (Step S108).

Then, the obstacle detection device 100 returns the processing to the processing in Step S101.

If neither of the wave transmission/reception devices 51 and 52 has received a reflected sound wave in the above-described processing in Step S101 (Step S101: No), the obstacle detection device 100 determines whether or not previous data exists (Step S109).

If previous data exists (Step S109: Yes), the obstacle detection device 100 estimates a position coordinate of an obstacle at the current time point (Step S110), and determines an angle of an obstacle detected last time, on the basis of the estimated position coordinate (Step S111).

Then, the obstacle detection device 100 returns the processing to the processing in Step S101.

If previous data does not exist (Step S109: No), the obstacle detection device 100 invalidates information such as a position, an angle, and a reliability of an obstacle that has been acquired up to the second last time (Step S112).

Then, the obstacle detection device 100 returns the processing to the processing in Step S101.

In the above-described processing in Step S105, in a case where the reliability of the obstacle detected this time has reached the predetermined reliability (Step S105: Yes), the obstacle detection device 100 outputs, to the vehicle control device 20 of the drive assist device 200, at least either of a signal for applying braking to the vehicle body 2 and a signal for suppressing acceleration of the vehicle body 2, on the basis of the obstacle detected this time (Step S106).

Then, the obstacle detection device 100 returns the processing to the processing in Step S101.

Note that the above-described coordinate estimation processing in Step S103 or S110 needs not be always performed at a timing illustrated in FIG. 7. The obstacle detection device 100 may continuously execute coordinate estimation processing at a predetermined cycle, and refer to a coordinate estimated most recently, at the timing at which the processing in Step S104 or S111 is performed.

In addition, the obstacle detection device 100 may perform the above-described processing in Steps S101 to S112 in a time-division manner. With this configuration, it is possible to identify the position of an obstacle with respect to the vehicle 1 and control the drive assist device 200, in accordance with a temporal change in the position of the vehicle 1.

In addition, in place of or in addition to this, a driver may be notified of detected information of an obstacle, distance information up to an obstacle, and so forth. The notification of these pieces of information to the driver can be performed by displaying a warning on a navigation device or a headup display. In addition, alternatively, information notification to a driver may be performed by emitting warning sound, or blinking or lighting an LED lamp.

In addition, in the above-described example, the predetermined reliability in Step S105 is set to the reliability RL3, but the predetermined reliability is not limited to this, and the predetermined reliability in Step S105 may be set to the reliability RL2.

Overview

Figure 8A:
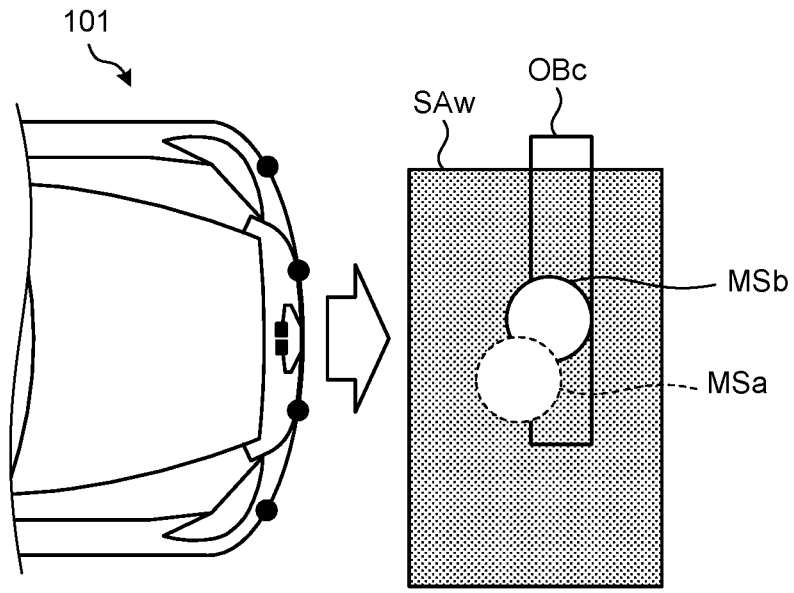
FIG. 8A is a schematic diagram illustrating an example of a case where a vehicle according to a comparative example performs same object determination on an obstacle.

In obstacle detection that uses sound waves such as ultrasound waves, in a case where coordinates obtained by performing distance measurement a plurality of times exist at positions close to each other within a predetermined range, a determination is made such that an obstacle exists. As illustrated in FIG. 8A, as for an obstacle OBc facing a vehicle 101 of a comparative example in the traveling direction, even if the position of the vehicle 101 changes, coordinates MSa and MSb to be obtained are at positions close to each other.

Figure 8B:
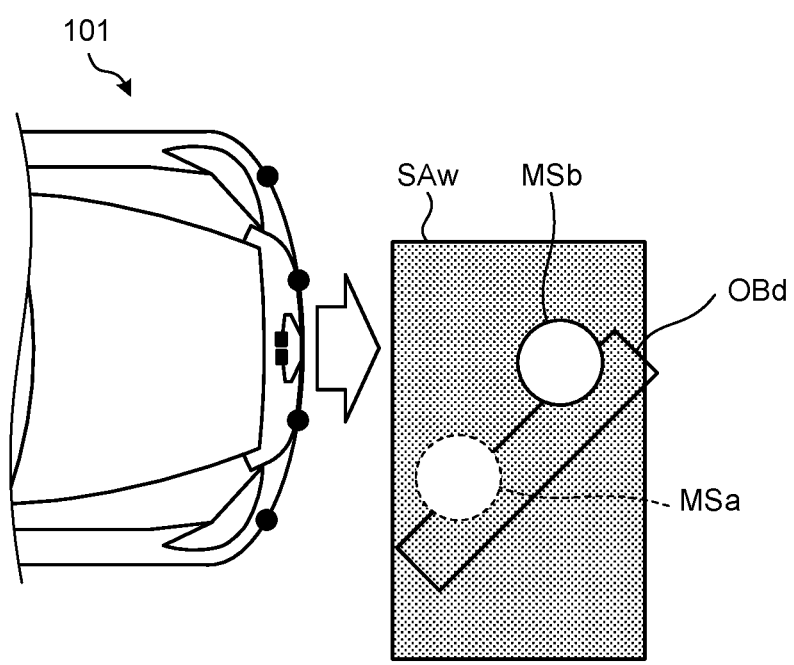
FIG. 8B is a schematic diagram illustrating an example of a case where a vehicle according to a comparative example performs same object determination on an obstacle.

On the other hand, as illustrated in FIG. 8B, as for an obstacle OBd obliquely-arranged with respect to the traveling direction of the vehicle 101 of the comparative example, for example, as the vehicle 101 moves closer to the obstacle OBd, obtained coordinates MSa and MSb move away from the vehicle 101. It is therefore necessary to ensure a wide range as a range SAw for determining whether or not obtained coordinates MSa and MSb are at positions close to each other, for example, in such a manner that the obstacle OBd not facing the vehicle 101 is also detected.

However, as described above, if a wide range is set as the range SAw, non-identical objects might be determined as the identical objects, and thereby a malfunction might occur.

According to the obstacle detection device 100 of the first embodiment, the same object determination region SAd adapted to the angle of the obstacle OBd is set on the basis of an angle and a position of the obstacle OBd. In other words, the same object determination region SAd is arranged in such a manner that an orthogonal direction of the long sides of the same object determination region extends in the normal direction NRd of the surface SRd of the obstacle OBd that faces the vehicle 1 side.

With this configuration, it is possible to enhance the accuracy of same object determination of the obstacle OBd obliquely-positioned with respect to the vehicle 1, without increasing the depth, that is, threshold value of the same object determination region SAd. In other words, it is possible to narrow a threshold value of same object determination to such an extent that the resolution capability of the wave transmission/reception unit 5 is allowed. It is accordingly possible to suppress erroneous determination of determining non-identical objects as the identical objects, and prevent erroneous control or unnecessary control from being performed on the vehicle 1.

According to the obstacle detection device 100 of the first embodiment, angles of the obstacles OBc and OBd are determined on the basis of positions of the obstacles OBc and OBd with respect to the vehicle 1.

Specifically, in a case where the position of the obstacle OBc falls within the facing object region FA to be used in determination as to whether or not the obstacle OBc faces the vehicle 1, an angle in the normal direction NRc of the surface SRc of the obstacle OBc that faces the vehicle 1 side is set to 0° with respect to the X direction of the vehicle 1.

In addition, in a case where the position of the obstacle OBd falls outside the facing object region FA to be used in determination as to whether or not the obstacle OBd faces the vehicle 1, an angle in the normal direction NRd of the surface SRd of the obstacle OBd that faces the vehicle 1 side is inclined at a predetermined angle with respect to the X direction of the vehicle 1.

With this configuration, it is possible to make consistency in the depths, that is, threshold values of the same object determination region SAc and SAd between the obstacle OBc facing the vehicle 1, and the obstacle OBd obliquely-arranged with respect to the vehicle 1, and possible to perform same object determination with equivalent accuracy on the obstacles OBc and OBd.

According to the obstacle detection device 100 of the first embodiment, as the position of the obstacle OBd deviates outward from the facing object region FA in the +Y direction of the vehicle 1, the angle +θ of the obstacle OBd becomes larger. In addition, as the position of an obstacle deviates outward from the facing object region FA in the −Y direction of the vehicle 1, the angle −θ of the obstacle becomes smaller.

With this configuration, it is possible to determine an angle of the obstacle OBd more finely, and set the same object determination region SAd more properly. Accordingly, the accuracy of same object determination is further enhanced.

Modified Example

In the above-described first embodiment, the description has been given of an example in which the obstacle detection device 100 performs control of the vehicle 1 in a case where determinations are made two consecutive times such that obstacles detected at the different timings are the same object, and a reliability of a predetermined obstacle reaches the reliability RL3.

However, in a case where determinations are made three consecutive times or more such that obstacles are the same object, the obstacle detection device 100 may perform control of the vehicle 1 after determining that a reliability has reached a predetermined reliability.

In addition, in FIGS. 5, 6, and 9, a case where an obstacle is motionless has been described, but the case is not limited to this. Even in a case where an obstacle is moving, the above-described technique can be applied.

Second Embodiment

Next, an example of the second embodiment will be described by using the drawings. Note that, as for the technical features illustrated in FIGS. 1A to 4 and 7, an obstacle detection device 110 according to the second embodiment has technical features basically similar to those of the obstacle detection device 100 according to the first embodiment. Thus, the description thereof will be omitted.

Figure 10:
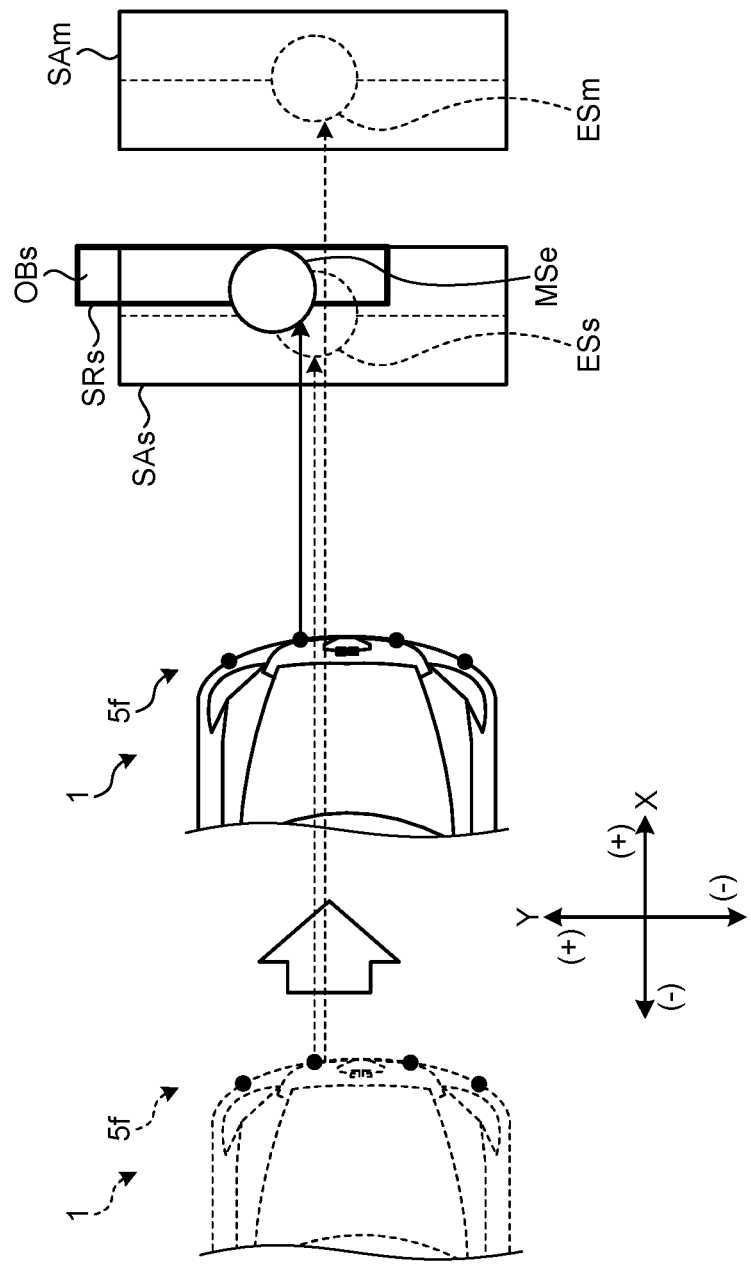
FIG. 10 is a schematic diagram illustrating an example of a case where an obstacle detection device according to the second embodiment performs same object determination on a motionless obstacle.

FIG. 10 is a schematic diagram illustrating an operation in which the obstacle detection device 110 performs same object determination on a motionless obstacle OBs that remains stationary. In FIG. 10, the surface SRs of the obstacle OBs faces the vehicle 1. Note that remaining stationary means an absolutely motionless state. For example, in a case where the vehicle 1 is moving forward, remaining stationary means that the motionless obstacle OBs gets closer to the vehicle 1, from the aspect of a relative positional relationship with the vehicle 1.

The obstacle detection device 110 performs the detection of the obstacle OBs at a predetermined cycle. The obstacle detection device 110 calculates a position of the motionless obstacle OBs as a motionless estimated point ESs on the basis of previous data detected last time, and sets a motionless same object determination region SAs from the motionless estimated point ESs. The motionless same object determination region SAs is a rectangle having a pair of long sides and a pair of short sides. The motionless same object determination region SAs is not limited to this, and the motionless same object determination region SAs may be a square, a parallelogram, or a simple quadrangle. Alternatively, the motionless same object determination region SAs may merely have a predetermined shape.

Moreover, the obstacle detection device 110 calculates a position of a moving obstacle OBm as a moving estimated point ESm on the basis of previous data detected last time, and sets a moving same object determination region SAm from the moving estimated point ESm. The movement of the moving obstacle OBm means an absolutely-moving state of the obstacle. If the moving obstacle OBm is moving in the same direction at the same speed as the vehicle 1, this means a motionless state from the aspect of a relative positional relationship between the vehicle 1 and the moving obstacle OBm. An example of the moving obstacle OBm may be another vehicle that is running in front of the vehicle 1 during congestion. In addition, the moving same object determination region SAm is a rectangle having a pair of long sides and a pair of short sides, but the moving same object determination region SAm is not limited to this. The moving same object determination region SAm may be a square, a parallelogram, or a simple quadrangle. Alternatively, the moving same object determination region SAm may merely have a predetermined shape.

The previous data refers to a position coordinate of the obstacle OBs or the obstacle OBm that has been calculated on the basis of transmission sound waves and reflected sound waves transmitted and received before transmission sound waves to be transmitted afterward. The obstacle detection device 110 calculates the motionless estimated point ESs and the moving estimated point ESm from these pieces of previous data.

The motionless estimated point ESs is obtained by calculating relative positions from the vehicle 1 at the current time point to coordinates of the motionless obstacle OBs and the moving obstacle OBm detected last time, on the basis of the coordinates of the motionless obstacle OBs and the moving obstacle OBm detected last time, and a moving amount and a turning angle of the vehicle 1 from the previous detection time point to the current time point. The motionless estimated point ESs is an estimated position of a motionless obstacle supposed to be detected by transmission sound waves to be transmitted next time.

The motionless same object determination region SAs is a rectangular region having a pair of long sides and a pair of short sides, and being centered on the calculated motionless estimated point ESs. The length of the pair of long sides is determined depending on a distance (X direction distance) from the vehicle 1.

The moving estimated point ESm is obtained by calculating relative positions from the vehicle 1 at the current time point to coordinates of the motionless obstacle OBs and the moving obstacle OBm detected last time, on the basis of the coordinates of the motionless obstacle OBs and the moving obstacle OBm detected last time, and a moving amount and a turning angle of the vehicle 1 from the previous detection time point to the current time point. The moving estimated point ESm is an estimated position of a moving obstacle supposed to be detected by transmission sound waves to be transmitted next time. The moving same object determination region SAm is premised on that the moving obstacle OBm is moving, so that the moving same object determination region SAm is set at a position farther than the motionless same object determination region SAs with respect to the vehicle 1.

The moving same object determination region SAm is a rectangular region having a pair of long sides and a pair of short sides and being centered on the calculated moving estimated point ESm. The length of the pair of long sides is determined depending on a distance (X direction distance) from the vehicle 1.

The obstacle detection device 110 transmits transmission sound waves for performing measurement next. The obstacle detection device 110 calculates a position coordinate of a distance measurement point MSe indicating the position of the obstacle, on the basis of the transmission sound waves and the reflected sound waves of this time. Next, the obstacle detection device 110 determines whether or not the distance measurement point MSe calculated this time falls within the motionless same object determination region SAs set on the basis of the previous data, and falls within the moving same object determination region SAm.

As illustrated in FIG. 10, in a case where the distance measurement point MSe falls within the motionless same object determination region SAs set on the basis of the previous data, that is, in a case where motionless same object determination succeeds, a reliability of a detected obstacle is increased as described later.

Figure 11:
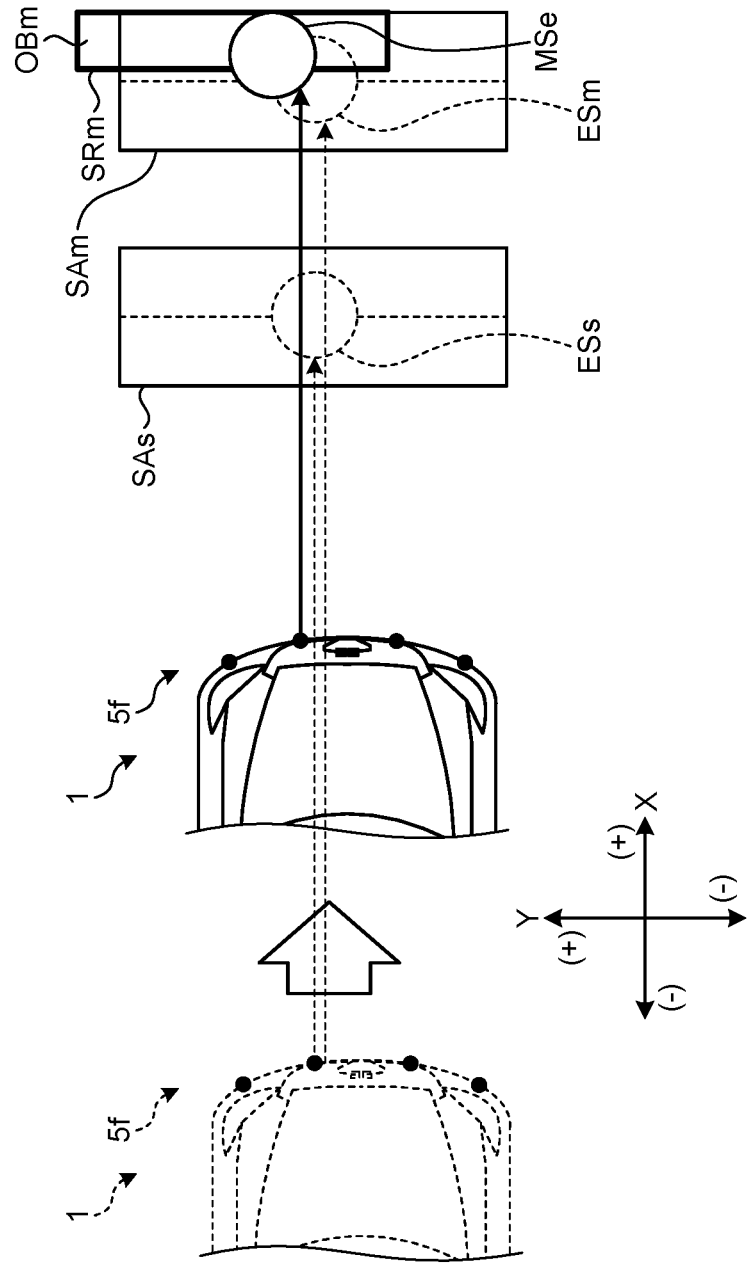
FIG. 11 is a schematic diagram illustrating an example of a case where an obstacle detection device according to the second embodiment performs same object determination on a moving obstacle.

Note that, in FIGS. 10 and 11, the motionless same object determination region SAs and the moving same object determination region SAm are set at a distance so as to avoid overlap, but their positions are not limited to these. The motionless same object determination region SAs and the moving same object determination region SAm may be set in such a manner as to partially overlap (not illustrated). Nevertheless, even in this case, a portion of the moving same object determination region SAm that does not overlap the motionless same object determination region SAs is set at a position farther than the motionless same object determination region SAs with respect to the vehicle 1.

FIG. 11 is a schematic diagram illustrating an operation in which the obstacle detection device 110 performs same object determination on the moving obstacle OBm that is moving. FIG. 11 is similar to FIG. 10 except that the moving obstacle OBm is moving. In FIG. 11, a surface SRm of the obstacle OBm faces the vehicle 1. The obstacle detection device 110 calculates a position coordinate of a distance measurement point MSe indicating the position of the obstacle, on the basis of the transmission sound waves and the reflected sound waves of this time. Next, the obstacle detection device 110 determines whether or not the distance measurement point MSe calculated this time falls within the motionless same object determination region SAs, which has been set on the basis of the previous data, and falls within the moving same object determination region SAm.

As illustrated in FIG. 11, in a case where the distance measurement point MSe falls within the moving same object determination region SAm set on the basis of the previous data, that is, in a case where moving same object determination succeeds, a reliability of a detected obstacle is increased as described later.

Figure 12:
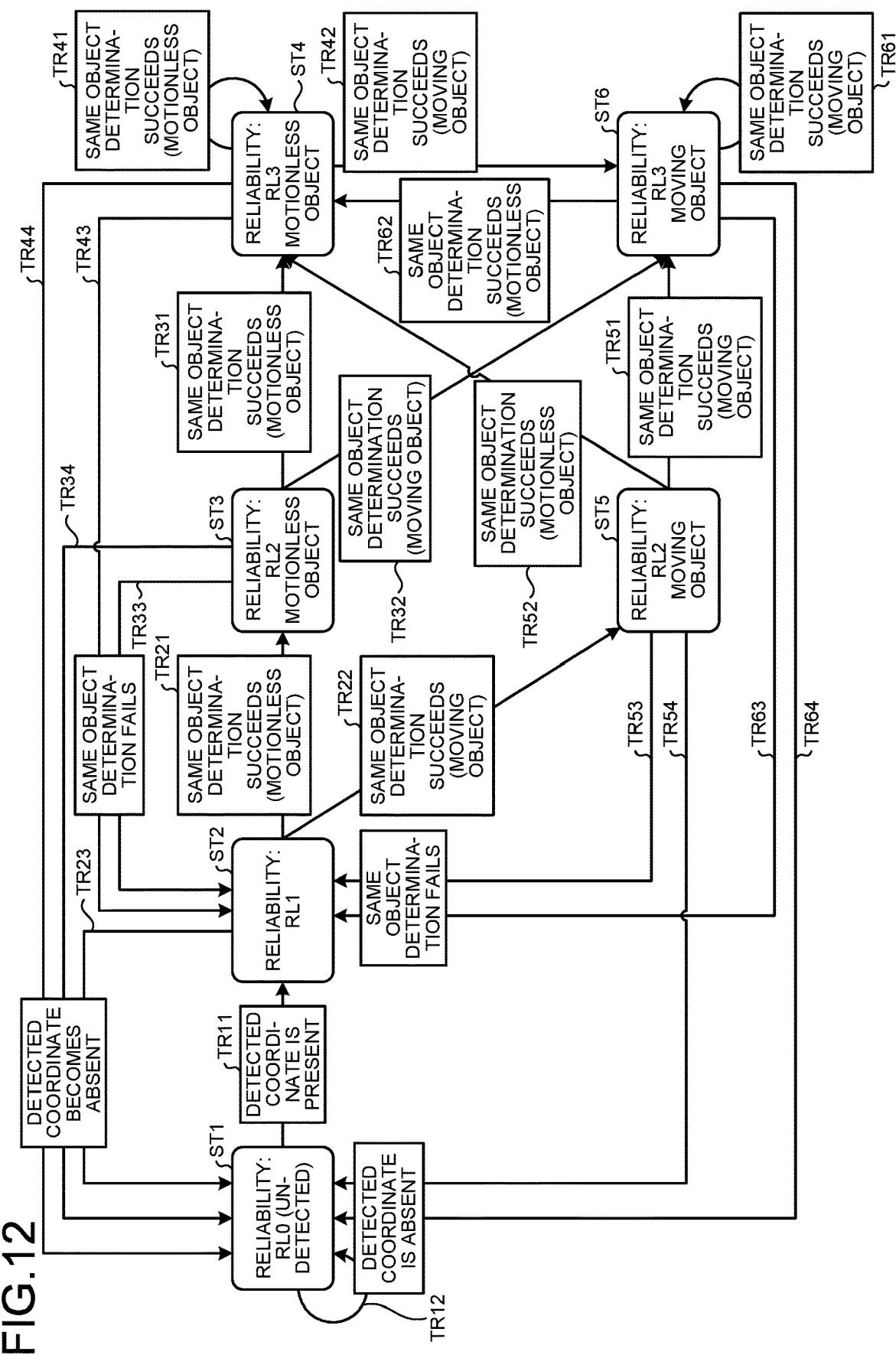
FIG. 12 is a state transition diagram illustrating a state transition related to the reliability of an obstacle detected by the obstacle detection device according to the second embodiment.

FIG. 12 is a state transition diagram illustrating a state transition related to the reliability of an obstacle detected by the obstacle detection device 110. In the state transition diagram in FIG. 12, ST1, ST2, TR11, TR12, TR23, TR34, and TR44 are basically similar to those in the state transition diagram illustrated in FIG. 9. Thus, the description will be omitted.

In ST2, in a case where motionless same object determination succeeds as described in FIG. 10 (TR21), a reliability is set to the reliability RL2 higher than the reliability RL1 (ST3). In ST2, in a case where moving same object determination succeeds as described in FIG. 11 (TR22), a reliability is set to the reliability RL2 (ST5).

In ST3, in a case where motionless same object determination succeeds as described in FIG. 10 (TR31), a reliability is set to the reliability RL3 higher than the reliability RL2 (ST4). In ST3, in a case where moving same object determination succeeds as described in FIG. 11 (TR32), a reliability is set to the reliability RL3 (ST6). In ST3, in a case where a detected coordinate is present but motionless same object determination does not succeed and moving same object determination does not succeed (TR33), the state returns to ST2.

In ST5, in a case where motionless same object determination succeeds as described in FIG. 10 (TR52), a reliability is set to the reliability RL3 (ST4). In ST5, in a case where moving same object determination succeeds as described in FIG. 11 (TR51), a reliability is set to the reliability RL3 (ST6). In ST5, in a case where a detected coordinate becomes absent (TR54), the state returns to ST1. In ST5, in a case where a detected coordinate is present but motionless same object determination does not succeed and moving same object determination does not succeed (TR53), the state returns to ST2.

In ST4, in a case where motionless same object determination succeeds as described in FIG. 10 (TR41), a reliability remains at the reliability RL3 (ST4). In ST4, in a case where moving same object determination succeeds as described in FIG. 11 (TR42), a reliability remains at the reliability RL3 (ST6). In ST4, in a case where a detected coordinate is present but motionless same object determination does not succeed and moving same object determination does not succeed (TR43), the state returns to ST2.

In ST6, in a case where motionless same object determination succeeds as described in FIG. 10 (TR62), a reliability remains at the reliability RL3 (ST4). In ST6, in a case where moving same object determination succeeds as described in FIG. 11 (TR61), a reliability remains at the reliability RL3 (ST6). In ST6, in a case where a detected coordinate becomes absent (TR64), the state returns to ST1. In ST6, in a case where a detected coordinate is present but motionless same object determination does not succeed and moving same object determination does not succeed (TR63), the state returns to ST2.

In this manner, as illustrated in FIG. 12, the obstacle detection device 110 executes the motionless same object determination illustrated in FIG. 10, and the moving same object determination illustrated in FIG. 11, in the states in ST1 to ST6, and causes the states in ST1 to ST6 to transition in accordance with the execution result. The reliability RL1 is allocated to ST1, the reliability RL2 is allocated to ST3 and ST5, and the reliability RL3 is allocated to ST4 and ST6. Therefore, a reliability is uniquely defined to any of the reliabilities RL1 to RL3 in accordance with the state of the obstacle detection device 110 transitioning in ST2 to ST6.

With this configuration, the obstacle detection device 110 includes the motionless same object determination region SAs supposed to be a position of a motionless obstacle, and the moving same object determination region SAm supposed to be a position of a moving obstacle. By managing a reliability of an obstacle detection result of a motionless obstacle by using the motionless same object determination region SAs, and managing a reliability of an obstacle detection result of a moving obstacle by using the moving same object determination region SAm, reliability management of a detection result of a motionless obstacle and reliability management of a detection result of a moving obstacle become more appropriate, and the accuracy of a detection result of an obstacle can be consequently enhanced.

Moreover, the drive assist device 200 that receives the input of a detection result and a reliability of an obstacle can perform control of the vehicle 1 considering the reliability as well. For example, only in a case where an obstacle is detected and a reliability is the reliability RL3, braking may be applied to the vehicle 1, and/or acceleration of the vehicle body may be suppressed. Alternatively, in a case where an obstacle is detected and a reliability is the reliability RL2 or the reliability RL3, braking may be applied to the vehicle 1 by using the brake actuator 24.

In addition, the obstacle detection device 110 may implement the functions of the obstacle detection device 100 in a superimposed manner. Note that, in Step S104 illustrated in FIG. 7, the obstacle detection device 110 performs both of the motionless same object determination exemplified in FIG. 10 and the moving same object determination exemplified in FIG. 11.

Several embodiments of the present disclosure have been described, but these embodiments are presented as examples, and are not intended to limit the scope of the invention. These embodiments can be implemented in other various forms, and various omissions, replacements, and changes can be made without departing from the gist of the invention. These embodiments and modified examples thereof are included in the scope and gist of the invention, and are similarly included in the scope of an equivalent of the invention described in the appended claims.

Moreover, the techniques described in the first embodiment and the second embodiment can also be regarded as described in the following C1-C20.

(C1)

A vehicle including:

a first wheel;

a second wheel arranged in a predetermined direction extending in a rotational direction of the first wheel;

a vehicle body that is coupled to the first wheel and the second wheel and is movable by the first wheel and the second wheel;

a wave transmission unit that is arranged in a predetermined end portion of the vehicle body and configured to transmit a transmission sound wave; and a wave reception unit that is arranged in the predetermined end portion of the vehicle body, and configured to receive a reception sound wave, wherein the wave transmission unit transmits a first transmission sound wave, the wave reception unit receives, as the reception sound wave, a first reflected sound wave corresponding to the first transmission sound wave, a position of a first obstacle is obtained and an angle in a normal direction of a first surface of the first obstacle with respect to the predetermined direction is obtained, on the basis of the first transmission sound wave and the first reflected sound wave, a same object determination region adapted to the angle of the first obstacle is set on the basis of the position and the angle of the first obstacle, the wave transmission unit next transmits a second transmission sound wave, the wave reception unit receives, as the reception sound wave, a second reflected sound wave corresponding to the second transmission sound wave, a position of a second obstacle is obtained on the basis of the second transmission sound wave and the second reflected sound wave, a reliability of the second obstacle is set to a first reliability in a case where the position of the second obstacle falls outside the same object determination region, a reliability of the second obstacle is set to a second reliability higher than the first reliability in a case where the position of the second obstacle falls within the same object determination region, and braking is applied to the vehicle body and/or acceleration of the vehicle body is suppressed, on the basis of the reliability of the second obstacle and the position of the second obstacle.

(C2)

The vehicle according to C1, further including
a control circuit,
wherein the control circuit
obtains a position of a first obstacle and obtains an angle in a normal direction of a first surface of the first obstacle with respect to the predetermined direction, on the basis of the first transmission sound wave and the first reflected sound wave,
sets a same object determination region adapted to the angle of the first obstacle, on the basis of the position and the angle of the first obstacle,
obtains a position of a second obstacle on the basis of the second transmission sound wave and the second reflected sound wave,
sets a reliability of the second obstacle to a first reliability in a case where the position of the second obstacle falls outside the same object determination region, and
sets a reliability of the second obstacle to a second reliability higher than the first reliability in a case where the position of the second obstacle falls within the same object determination region.

(C3)

The vehicle according to C1 or C2, wherein
the same object determination region includes a pair of long sides and a pair of short sides, and
the same object determination region is arranged in such a manner that an orthogonal direction of the long sides of the same object determination region extends in a normal direction of the first obstacle.

(C4)

The vehicle according to any one of C1 to C3, wherein
the angle in a normal direction of the first surface of the first obstacle is set to
0 degree in a case where a normal direction of the first surface is identical to the predetermined direction of the vehicle,
an angle of a positive value in a case where a normal direction of the first surface is oriented more leftward than the predetermined direction of the vehicle, and
an angle of a negative value in a case where a normal direction of the first surface is oriented more rightward than the predetermined direction of the vehicle,
in a case where a normal direction of the first surface is oriented more leftward than the predetermined direction of the vehicle, the angle becomes larger as a normal direction of the first surface deviates from the predetermined direction of the vehicle, and,
in a case where a normal direction of the first surface is oriented more rightward than the predetermined direction of the vehicle, the angle becomes smaller as a normal direction of the first surface deviates from the predetermined direction of the vehicle.

(C5)

The vehicle according to any one of C1 to C4, wherein
the wave transmission unit transmits the first transmission sound wave,
the wave reception unit receives, as the reception sound wave, the first reflected sound wave corresponding to the first transmission sound wave,
a position of a first obstacle is obtained and a first angle in a normal direction of a first surface of the first obstacle with respect to the predetermined direction is obtained, on the basis of the first transmission sound wave and the first reflected sound wave,
a first same object determination region adapted to the first angle of the first obstacle is set on the basis of the position and the first angle of the first obstacle,
the wave transmission unit next transmits a second transmission sound wave,
the wave reception unit receives, as the reception sound wave, the second reflected sound wave corresponding to the second transmission sound wave,
a position of a second obstacle is obtained and a second angle in a normal direction of a first surface of the second obstacle with respect to the predetermined direction is obtained, on the basis of the second transmission sound wave and the second reflected sound wave,
a reliability of the second obstacle is set to a second reliability higher than the first reliability in a case where the position of the second obstacle falls within the first same object determination region,
a second same object determination region adapted to the second angle of the second obstacle is set on the basis of the position and the second angle of the second obstacle,
the wave transmission unit next transmits a third transmission sound wave,
the wave reception unit receives, as the reception sound wave, a third reflected sound wave corresponding to the third transmission sound wave,
a position of a third obstacle is obtained on the basis of the third transmission sound wave and the third reflected sound wave,
a reliability of the third obstacle is set to a third reliability higher than the second reliability in a case where the position of the third obstacle falls within the second same object determination region, and braking is applied to the vehicle body and/or acceleration of the vehicle body is suppressed, on the basis of the position of the third obstacle, in a case where the reliability of the third obstacle is the third reliability.

(C6)

The vehicle according to C5, wherein a reliability of the third obstacle is set to the first reliability in a case where the position of the third obstacle falls outside the second same object determination region, and braking is not applied to the vehicle body and/or acceleration of the vehicle body is not suppressed, on the basis of the position of the third obstacle, in a case where the reliability of the third obstacle is set to the first reliability.

(C7)

The vehicle according to any one of C1 to C6, wherein the predetermined end portion of the vehicle is an end portion of the vehicle in the predetermined direction.

(C8)

The vehicle according to any one of C1 to C7, further including a bumper, wherein the wave transmission unit and the wave reception unit are arranged on the bumper.

(C9)

The vehicle according to any one of C1 to C8, further including a third wheel and a fourth wheel, the fourth wheel being arranged in the predetermined direction which is a direction extending in a rotational direction of the third wheel, wherein the third wheel and the fourth wheel are coupled to the vehicle body, and the vehicle body is movable by the first wheel, the second wheel, the third wheel, and the fourth wheel.

(C10)

The vehicle according to any one of C1 to C9, further including:

a braking unit configured to apply braking to at least one of the first wheel and the second wheel; and a drive unit configured to apply driving to at least one of the first wheel and the second wheel.

(C11)

An obstacle detection device installable in a vehicle, the vehicle including:

a first wheel;

a second wheel arranged in a predetermined direction extending in a rotational direction of the first wheel; and a vehicle body that is coupled to the first wheel and the second wheel and is movable by the first wheel and the second wheel, the obstacle detection device including:

a wave transmission unit that is arranged in a predetermined end portion of the vehicle body, and configured to transmit a transmission sound wave; and a wave reception unit that is arranged in the predetermined end portion of the vehicle body and configured to receive a reception sound wave, wherein the wave transmission unit transmits a first transmission sound wave, the wave reception unit receives, as the reception sound wave, a first reflected sound wave corresponding to the first transmission sound wave, a position of a first obstacle is obtained and an angle in a normal direction of a first surface of the first obstacle with respect to the predetermined direction is obtained, on the basis of the first transmission sound wave and the first reflected sound wave, a same object determination region adapted to the angle of the first obstacle is set on the basis of the position and the angle of the first obstacle, the wave transmission unit next transmits a second transmission sound wave, the wave reception unit receives, as the reception sound wave, a second reflected sound wave corresponding to the second transmission sound wave, a position of a second obstacle is obtained on the basis of the second transmission sound wave and the second reflected sound wave, a reliability of the second obstacle is set to a first reliability in a case where the position of the second obstacle falls outside the same object determination region, a reliability of the second obstacle is set to a second reliability higher than the first reliability in a case where the position of the second obstacle falls within the same object determination region, and a signal is output in such a manner that braking is applied to the vehicle body and/or acceleration of the vehicle body is suppressed, on the basis of the reliability of the second obstacle and the position of the second obstacle.

(C12)

The obstacle detection device according to C11, further including a control circuit, wherein the control circuit is configured to obtain a position of a first obstacle and obtains an angle in a normal direction of a first surface of the first obstacle with respect to the predetermined direction, on the basis of the first transmission sound wave and the first reflected sound wave, set a same object determination region adapted to the angle of the first obstacle, on the basis of the position and the angle of the first obstacle, obtain a position of a second obstacle on the basis of the second transmission sound wave and the second reflected sound wave, set a reliability of the second obstacle to a first reliability in a case where the position of the second obstacle falls outside the same object determination region, and sets a reliability of the second obstacle to a second reliability higher than the first reliability in a case where the position of the second obstacle falls within the same object determination region.

(C13)

The obstacle detection device according to C11 or C12, wherein the same object determination region includes a pair of long sides and a pair of short sides, and the same object determination region is arranged in such a manner that an orthogonal direction of the long sides of the same object determination region extends in a normal direction of the first obstacle.

(C14)

The obstacle detection device according to any one of C11 to C13, wherein the angle in a normal direction of the first surface of the first obstacle is set to 0 degree in a case where a normal direction of the first surface is identical to the predetermined direction of the vehicle, an angle of a positive value in a case where a normal direction of the first surface is oriented more leftward than the predetermined direction of the vehicle, and an angle of a negative value in a case where a normal direction of the first surface is oriented more rightward than the predetermined direction of the vehicle, in a case where a normal direction of the first surface is oriented more leftward than the predetermined direction of the vehicle, the angle becomes larger as a normal direction of the first surface deviates from the predetermined direction of the vehicle, and, in a case where a normal direction of the first surface is oriented more rightward than the predetermined direction of the vehicle, the angle becomes smaller as a normal direction of the first surface deviates from the predetermined direction of the vehicle.

(C15)

The obstacle detection device according to any one of C11 to C14, wherein the wave transmission unit transmits the first transmission sound wave, the wave reception unit receives, as the reception sound wave, the first reflected sound wave corresponding to the first transmission sound wave, a position of a first obstacle is obtained and a first angle in a normal direction of a first surface of the first obstacle with respect to the predetermined direction is obtained, on the basis of the first transmission sound wave and the first reflected sound wave, a first same object determination region adapted to the first angle of the first obstacle is set on the basis of the position and the first angle of the first obstacle, the wave transmission unit next transmits a second transmission sound wave, the wave reception unit receives, as the reception sound wave, the second reflected sound wave corresponding to the second transmission sound wave, a position of a second obstacle is obtained and a second angle in a normal direction of a first surface of the second obstacle with respect to the predetermined direction is obtained, on the basis of the second transmission sound wave and the second reflected sound wave, a reliability of the second obstacle is set to a second reliability higher than the first reliability in a case where the position of the second obstacle falls within the first same object determination region, a second same object determination region adapted to the second angle of the second obstacle is set on the basis of the position and the second angle of the second obstacle, the wave transmission unit next transmits a third transmission sound wave, the wave reception unit receives, as the reception sound wave, a third reflected sound wave corresponding to the third transmission sound wave, a position of a third obstacle is obtained on the basis of the third transmission sound wave and the third reflected sound wave, a reliability of the third obstacle is set to a third reliability higher than the second reliability in a case where the position of the third obstacle falls within the second same object determination region, and a signal is output in such a manner that braking is applied to the vehicle body and/or acceleration of the vehicle body is suppressed, on the basis of the position of the third obstacle, in a case where the reliability of the third obstacle is the third reliability.

(C16)

The obstacle detection device according to C15, wherein a reliability of the third obstacle is set to the first reliability in a case where the position of the third obstacle falls outside the second same object determination region, and a signal is output in such a manner that braking is not applied to the vehicle body and/or acceleration of the vehicle body is not suppressed, on the basis of the position of the third obstacle, in a case where the reliability of the third obstacle is set to the first reliability.

(C17)

The obstacle detection device according to any one of C11 to C16, wherein the predetermined end portion of the vehicle is an end portion of the vehicle in the predetermined direction.

(C18)

The obstacle detection device according to any one of C11 to C17, further including a bumper, wherein the wave transmission unit and the wave reception unit are arranged on the bumper.

(C19)

The obstacle detection device according to any one of C11 to C18, wherein the vehicle further includes a third wheel and a fourth wheel, the fourth wheel being arranged in the predetermined direction which is a direction extending in a rotational direction of the third wheel, the third wheel and the fourth wheel are coupled to the vehicle body, and the vehicle body is movable by the first wheel, the second wheel, the third wheel, and the fourth wheel.

(C20)

The obstacle detection device according to any one of C11 to C19, wherein the vehicle further includes:

a braking unit configured to apply braking to at least one of the first wheel and the second wheel; and a drive unit configured to apply driving to at least one of the first wheel and the second wheel.

What is claimed is:

1. A vehicle, comprising:

a first wheel and a second wheel arranged in a direction;

a vehicle body coupled to the first wheel and the second wheel, the vehicle body being movable with the first wheel and the second wheel;

a wave transmission device arranged in an end portion of the vehicle body and configured to transmit transmission sound waves; and a wave reception device arranged in the end portion of the vehicle body and configured to receive reception sound waves, wherein the wave transmission device transmits a first transmission sound wave, the wave reception device receives, as a first one of the reception sound waves, a first reflected sound wave corresponding to the first transmission sound wave, the vehicle obtains a first position of a first obstacle based on the first transmission sound wave and the first reflected sound wave, the vehicle sets a motionless same object determination region and a moving same object determination region based on the first position of the first obstacle, at least a part of the moving same object determination region being located at a position farther than the motionless same object determination region with respect to the vehicle body, the wave transmission device transmits a second transmission sound wave, after the wave transmission device transmits the first transmission sound wave, the wave reception device receives, as a second one of the reception sound waves, a second reflected sound wave corresponding to the second transmission sound wave, the vehicle obtains a second position of a second obstacle based on the second transmission sound wave and the second reflected sound wave, the vehicle sets a reliability of the second obstacle to a first reliability when the second position of the second obstacle is located out of the motionless same object determination region and is located out of the moving same object determination region, the vehicle sets the reliability of the second obstacle to a second reliability higher than the first reliability when the second position of the second obstacle is located in the motionless same object determination region or is located in the moving same object determination region, and the vehicle applies at least one of braking of the vehicle body or suppression of acceleration of the vehicle body, based on the reliability of the second obstacle and the second position of the second obstacle, the reliability of the second obstacle being equal to the first reliability or the second reliability.

2. The vehicle according to claim 1, further comprising: a control circuit, wherein the control circuit is configured to obtain the first position of the first obstacle based on the first transmission sound wave and the first reflected sound wave, set the motionless same object determination region and the moving same object determination region based on the first position of the first obstacle, obtain the second position of the second obstacle based on the second transmission sound wave and the second reflected sound wave, set the reliability of the second obstacle to the first reliability when the second position of the second obstacle is located out of the motionless same object determination region and is located out of the moving same object determination region, and set the reliability of the second obstacle to the second reliability when the second position of the second obstacle is located in the motionless same object determination region or is located in the moving same object determination region.

3. The vehicle according to claim 1, wherein the vehicle sets a distance between the motionless same object determination region and the moving same object determination region.

4. The vehicle according to claim 1, wherein the vehicle sets the motionless same object determination region and the moving same object determination region to partially overlap.

5. The vehicle according to claim 1, wherein the motionless same object determination region is defined as a first motionless same object determination region, and the moving same object determination region is defined as a first moving same object determination region, the vehicle sets the reliability of the second obstacle to the first reliability when the second position of the second obstacle is located out of the first motionless same object determination region and is located out of the first moving same object determination region, the vehicle sets the reliability of the second obstacle to the second reliability higher than the first reliability when the second position of the second obstacle is located in the first motionless same object determination region or is located in the first moving same object determination region, the wave transmission device transmits a third transmission sound wave, after the wave transmission device transmits the second transmission sound wave, the wave reception device receives, as a third one of the reception sound waves, a third reflected sound wave corresponding to the third transmission sound wave, the vehicle obtains a third position of a third obstacle based on the third transmission sound wave and the third reflected sound wave, the vehicle sets a reliability of the third obstacle to a third reliability higher than the second reliability when the third position of the third obstacle is located in the second motionless same object determination region or is located in the second moving same object determination region, and the vehicle applies the at least one of the braking of the vehicle body or the suppression of the acceleration of the vehicle body, based on the third position of the third obstacle, when the reliability of the third obstacle equals the third reliability.

6. The vehicle according to claim 5, wherein the vehicle sets the reliability of the third obstacle to the first reliability when the third position of the third obstacle is located out of the first motionless same object determination region and is located out of the first moving same object determination region, and the vehicle does not apply the at least one of the braking to the vehicle body or the suppression of the acceleration of the vehicle body, based on the third position of the third obstacle, when the reliability of the third obstacle equals the first reliability.

7. The vehicle according to claim 1, wherein the end portion of the vehicle is an end portion of the vehicle in the direction.

8. The vehicle according to claim 1, further comprising: at least one bumper, wherein the wave transmission device and the wave reception device are arranged on the at least one bumper.

9. The vehicle according to claim 1, further comprising: a third wheel and a fourth wheel, the fourth wheel being arranged in the direction, wherein the third wheel and the fourth wheel are coupled to the vehicle body, and the vehicle body is movable by the first wheel, the second wheel, the third wheel, and the fourth wheel.

10. The vehicle according to claim 1, further comprising:

a braking device configured to apply the braking to at least one of the first wheel and the second wheel; and a drive device configured to apply driving to at least one of the first wheel and the second wheel.

11. An obstacle detection device installable in a vehicle, the vehicle including a first wheel and a second wheel arranged in a direction, a vehicle body coupled to the first wheel and the second wheel, the vehicle body being movable with the first wheel and the second wheel, a wave transmission device being arranged in an end portion of the vehicle body and configured to transmit transmission sound waves, and a wave reception device being arranged in the end portion of the vehicle body and configured to receive reception sound waves, wherein the wave transmission device transmits a first transmission sound wave, the wave reception device receives, as a first one of the reception sound waves, a first reflected sound wave corresponding to the first transmission sound wave, the obstacle detection device obtains a first position of a first obstacle based on the first transmission sound wave and the first reflected sound wave, the obstacle detection device sets a motionless same object determination region and a moving same object determination region based on the first position of the first obstacle, at least a part of the moving same object determination region being located at a position farther than the motionless same object determination region with respect to the vehicle body, the wave transmission device transmits a second transmission sound wave, after the wave transmission device transmits the first transmission sound wave, the wave reception device receives, as a second one of the reception sound waves, a second reflected sound wave corresponding to the second transmission sound wave, the obstacle detection device obtains a second position of a second obstacle based on the second transmission sound wave and the second reflected sound wave, the obstacle detection device sets a reliability of the second obstacle to a first reliability when the second position of the second obstacle is located out of the motionless same object determination region and is located out of the moving same object determination region, the obstacle detection device sets the reliability of the second obstacle to a second reliability higher than the first reliability when the second position of the second obstacle is located in the motionless same object determination region or is located in the moving same object determination region, and the obstacle detection device applies at least one of braking of the vehicle body or suppression of acceleration of the vehicle body, based on the reliability of the second obstacle and the second position of the second obstacle, the reliability of the second obstacle being equal to the first reliability or the second reliability.

12. The obstacle detection device according to claim 11, further comprising:

a control circuit, wherein the control circuit is configured to obtain the first position of the first obstacle based on the first transmission sound wave and the first reflected sound wave, set the motionless same object determination region and the moving same object determination region based on the first position of the first obstacle, obtain the second position of the second obstacle based on the second transmission sound wave and the second reflected sound wave, set the reliability of the second obstacle to the first reliability when the second position of the second obstacle is located out of the motionless same object determination region and is located out of the moving same object determination region, and set the reliability of the second obstacle to the second reliability when the second position of the second obstacle is located in the motionless same object determination region or is located in the moving same object determination region.

13. The obstacle detection device according to claim 11, wherein the obstacle detection device sets a distance between the motionless same object determination region and the moving same object determination region.

14. The obstacle detection device according to claim 11, wherein the obstacle detection device sets the motionless same object determination region and the moving same object determination region to partially overlap.

15. The obstacle detection device according to claim 11, wherein the motionless same object determination region is defined as a first motionless same object determination region, and the moving same object determination region is defined as a first moving same object determination region, the obstacle detection device sets the reliability of the second obstacle to the first reliability when the second position of the second obstacle is located out of the first motionless same object determination region and is located out of the first moving same object determination region, the obstacle detection device sets the reliability of the second obstacle to the second reliability higher than the first reliability when the second position of the second obstacle is located in the first motionless same object determination region or is located in the first moving same object determination region, the wave transmission device transmits a third transmission sound wave, after the wave transmission device transmits the second transmission sound wave, the wave reception device receives, as a third one of the reception sound waves, a third reflected sound wave corresponding to the third transmission sound wave, the obstacle detection device obtains a third position of a third obstacle based on the third transmission sound wave and the third reflected sound wave, the obstacle detection device sets a reliability of the third obstacle to a third reliability higher than the second reliability when the third position of the third obstacle is located in the second motionless same object determination region or is located in the second moving same object determination region, and the obstacle detection device applies the at least one of the braking of the vehicle body or the suppression of the acceleration of the vehicle body, based on the third position of the third obstacle, when the reliability of the third obstacle equals the third reliability.

16. The obstacle detection device according to claim 15, wherein the obstacle detection device sets the reliability of the third obstacle to the first reliability when the third position of the third obstacle is located out of the first motionless same object determination region and is located out of the first moving same object determination region, and the obstacle detection device does not apply the at least one of the braking to the vehicle body or the suppression of the acceleration of the vehicle body, based on the third position of the third obstacle, when the reliability of the third obstacle equals the first reliability.

17. The obstacle detection device according to claim 11, wherein the end portion of the vehicle is an end portion of the vehicle in the direction.

18. The obstacle detection device according to claim 11, wherein
- the vehicle further includes at least one bumper, and
- the wave transmission device and the wave reception device are arranged on the at least one bumper.

19. The obstacle detection device according to claim 11, wherein
- the vehicle further includes a third wheel and a fourth wheel, the fourth wheel being arranged in the direction,
- the third wheel and the fourth wheel are coupled to the vehicle body, and
- the vehicle body is movable by the first wheel, the second wheel, the third wheel, and the fourth wheel.

20. The obstacle detection device according to claim 11, wherein the vehicle further includes:
- a braking device configured to apply the braking to at least one of the first wheel and the second wheel; and
- a drive device configured to apply driving to at least one of the first wheel and the second wheel.

* * * * *